(12) United States Patent
Sato et al.

(10) Patent No.: US 8,317,404 B2
(45) Date of Patent: Nov. 27, 2012

(54) BEARING BALL CAGE AND METHOD OF MAKING THE SAME

(75) Inventors: Norihide Sato, Kuwana (JP); Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 409 days.

(21) Appl. No.: 12/449,193

(22) PCT Filed: Jan. 29, 2008

(86) PCT No.: PCT/JP2008/000106
§ 371 (c)(1),
(2), (4) Date: Jul. 28, 2009

(87) PCT Pub. No.: WO2008/093499
PCT Pub. Date: Aug. 7, 2008

(65) Prior Publication Data
US 2010/0098366 A1 Apr. 22, 2010

(30) Foreign Application Priority Data
Jan. 30, 2007 (JP) .................................. 2007-019345

(51) Int. Cl.
*F16C 33/41* (2006.01)
(52) U.S. Cl. ......................................... 384/523; 384/530
(58) Field of Classification Search .......... 384/523–525, 384/527, 528, 530, 533
See application file for complete search history.

(56) References Cited

U.S. PATENT DOCUMENTS

| | | | | |
|---|---|---|---|---|
| 2,861,849 A | * | 11/1958 | Case | 384/527 |
| 3,471,208 A | * | 10/1969 | Vannest | 384/530 |
| 4,492,415 A | * | 1/1985 | Baile et al. | 384/463 |
| 5,122,001 A | * | 6/1992 | Alling et al. | 384/530 |
| 6,068,408 A | | 5/2000 | Mutoh et al. | |
| 6,074,099 A | * | 6/2000 | Mutou et al. | 384/533 |
| 6,296,393 B1 | * | 10/2001 | Yabe et al. | 384/463 |
| 6,719,459 B1 | | 4/2004 | Gotoh | |
| 8,011,833 B2 | * | 9/2011 | Hirata et al. | 384/527 |
| 8,092,097 B2 | * | 1/2012 | Ohashi et al. | 384/580 |
| 2003/0077015 A1 | * | 4/2003 | Sugimori et al. | 384/513 |
| 2004/0141670 A1 | | 7/2004 | Gotoh | |

(Continued)

FOREIGN PATENT DOCUMENTS
GB 2306582 A * 5/1997
(Continued)

OTHER PUBLICATIONS

International Search Report for PCT/JP2008/000106, mailed Apr. 8, 2008.

(Continued)

*Primary Examiner* — Thomas R Hannon

(57) ABSTRACT

A cage for a ball bearing assembly has a pocket for accommodating one of the balls defined at a plurality of locations in a direction circumferentially thereof and each of the pockets has an inner surface so shaped as to represent a concaved spherical surface. A concaved portion extending from an open edge on the cage inner diametric side towards the cage outer diametric side is provided in an inner surface of each of the pockets. The sectional shape of the inner surface of this concaved portion in a cage circumferential direction is represented by an arcuate shape of a radius of curvature smaller than the radius of curvature of the concaved spherical surface defining the inner surface of the respective pocket. The inner surface of each of the pockets may be formed with a film.

11 Claims, 16 Drawing Sheets

U.S. PATENT DOCUMENTS

| | | |
|---|---|---|
| 2004/0141672 A1 | 7/2004 | Naito et al. |
| 2004/0252925 A1 | 12/2004 | Gotoh |
| 2006/0193545 A1* | 8/2006 | Bridges et al. ................ 384/470 |
| 2006/0291763 A1* | 12/2006 | Markle ......................... 384/530 |
| 2011/0002568 A1* | 1/2011 | Kawamura et al. ........... 384/470 |
| 2011/0305411 A1* | 12/2011 | Schweitzer ................... 384/495 |

FOREIGN PATENT DOCUMENTS

| | | |
|---|---|---|
| JP | 09-177790 | 7/1997 |
| JP | 11-125256 | 5/1999 |
| JP | 2000-257640 | 9/2000 |
| JP | 2001-116051 | 4/2001 |
| JP | 2002-98150 | 4/2002 |
| JP | 2002-323046 | 11/2002 |
| JP | 2003-013962 | 1/2003 |
| JP | 2003-120692 | 4/2003 |
| JP | 2003-239984 | 8/2003 |
| JP | 2004-162879 | 6/2004 |
| JP | 2005-069404 | 3/2005 |
| JP | 2005-308117 | 11/2005 |
| JP | 2006-71016 | 3/2006 |
| JP | 2006-342938 | 12/2006 |

OTHER PUBLICATIONS

English Translation of the International Preliminary Report on Patentability, mailed Aug. 13, 2009 in corresponding International Patent Application PCT/JP2008/000106.

Japanese Office Action mailed Jul. 10, 2012 issued in corresponding Japanese Patent Application No. 2008-017130.

* cited by examiner

BEARING BALL CAGE AND METHOD OF MAKING THE SAME

CROSS REFERENCE TO RELATED PATENT APPLICATIONS

This application claims the benefit under 35 U.S.C. Section 371, of PCT International Application Number PCT/JP2008/000106, filed Jan. 29, 2008, which claimed priority to Japanese Application No. 2007-019345 filed Jan. 30, 2007 in Japan, the contents of which are incorporated herein by reference.

BACKGROUND OF THE INVENTION

The present invention relates to a bearing ball cage of a ring shaped configuration, in which a pocket for accommodating a ball for a ball bearing assembly is defined at a plurality of locations in a direction circumferentially thereof and each of those pockets has an inner surface so shaped as to represent a concaved surface shape, and also to a method of manufacturing such bearing ball cage.

The present invention relates to a bearing ball cage of a ring shaped configuration, in which a pocket for accommodating a ball for a ball bearing assembly is defined at a plurality of locations in a direction circumferentially thereof and each of those pockets has an inner surface so shaped as to represent a concaved surface shape, and also to a method of manufacturing such bearing ball cage.

Various rotary devices, particularly sealed ball bearing assemblies that are used in automobile accessories are required to have a high thermostability, a resistance to high speed or high withstand speed, a resistance to muddy water, a resistance to dust, a resistance to grease leakage, a long lifetime and a low torque, and a space delimited between a bearing inner ring and a bearing outer ring in each of those bearing assemblies has its opposite ends provided with respective contact seals for the purpose of the resistance to muddy water and the resistance to dust.

In the sealed ball bearing assembly of the structure referred to above, in the event that the bearing temperature increased while grease is present in a sealing lip segment of one of the contact seals, the pressure inside the ball bearing assembly increases as a result of expansion of air within the ball bearing assembly and, accordingly, the sealing lip segment of the contact seal opens with the grease and/or air inside the ball bearing assembly consequently leaking to the outside of the ball bearing assembly due to the difference in pressure from the outside (which phenomenon is hereinafter referred to as a "breathing"). (See the Patent Document 1 listed below.)

To avoid the above discussed breathing, the provision has been suggested of a ventilating cutout in a portion of the sealing lip segment. (See the Patent Document 1 listed below.) It has, however, been found that once grease deposits on the cutout, leakage of the grease will occur as is the case with the ball bearing assembly discussed hereinabove. (See the Patent Document 2 listed below.)

Although it may be contemplated that without using the above discussed ventilating cutout, in a ball bearing assembly of, for example, an inner ring rotating type, an urging pressure (hereinafter referred to as a "tensioning force") for urging the sealing lip segment against a seal groove defined in an inner ring outer diametric surface, to which the sealing lip segment of the contact seal is urged, is strengthened to enhance prevention of the breathing, this approach merely results in increase of the torque and, in the event of a considerable temperature increase enough to result in an internal pressure higher than the tensioning force, there is no way of preventing the grease leakage. Also, in the event that the bearing temperature decreases, since the internal pressure lowers as a result of contraction of air inside the ball bearing assembly, an absorbing phenomenon of a foremost end of the sealing lip segment occurs, thus causing further increase of the torque. (See, for example, the Patent Document 3 listed below.)

Because of the foregoing reasons, even if any of the above discussed various structures is employed for the contact seal, it is difficult to avoid leakage of the grease once the grease deposits on the inner ring seal groove.

As a sealed ball bearing assembly, other than those discussed hereinabove, the type has been suggested, in which a cage is so sophisticatedly configured to avoid the grease leakage. (See, for example, the Patent Documents 4 and 5 listed below.) The cage disclosed in the Patent Document 4 is the type, in which in an inner surface of each of pockets, instead of an outer diametric side end portion being constricted to a diameter smaller than or equal to that of each ball, an inner diametric side portion is so designed as to represent a cylindrical surface of a diameter larger than that ball diameter. The cage disclosed in the Patent Document 5 is the type, in which a ball confronting surface of each pocket is formed with at least four projections so that each ball can be retained therein solely in contact with the projections.

[Patent Document 1] JP Laid-open Patent Publication No. 2000-257640
[Patent Document 2] JP Laid-open Patent Publication No. 2005-308117
[Patent Document 3] JP Laid-open Patent Publication No. 2005-069404
[Patent Document 4] JP Laid-open Patent Publication No. 2001-116051
[Patent Document 5] JP Laid-open Patent Publication No. 2003-239984

It has however been found that in the ball bearing assemblies disclosed respectively in the Patent Documents 4 and 5, each of the balls is retained by points or small surface areas and, therefore, the surface pressure tends to be high. For this reason, if the cage is made of a resinous material, it tends to be frictionally worn out quickly. Also, no application thereof can be made to a cage of a kind made by the use of the iron plate blanking technique. That is because, if a part of the shape is applied to the cage of the kind made by the use of the iron plate blanking technique, in the inner diametric side of the cage, the distance to the sealing lip segment will be too small, thus permitting the grease deposited on the cage to urge the sealing lip segment, accompanied by occurrence of the grease leakage. Also, it may be suspected that the torque may increase due to a shearing of the grease.

As discussed hereinabove, as a method to avoid the grease leakage, there are a tensioning force of the sealing lip segment, the shape of the sealing lip segment, the cutout and so on, but if due to rotation grease is present in an inner ring shoulder and/or seal groove, the possibility of occurrence of the grease leakage will become high. In particular, in the case of an outer ring rotation, since no centrifugal force acts on the inner ring, the grease once deposited in the inner ring seal groove will remain deposited therein. When while in this condition the temperature of the ball bearing assembly increases, the grease leakage will occur as a result of the breathing. Also, in the countermeasure by changing the shape of the cage, there are problems associated with the strength and frictional wear in the case of the resinous cage and, in the case of the cage made from a blanked iron plate, difficulty will be encountered in manufacturing the same.

FIGS. 23A to 23C illustrate a process of movement of the grease into the inner ring seal groove. As shown in FIG. 23A, when the surface of one of the balls 44 enters the corresponding pocket 51 on an inner diametric side of the cage 45, grease G sticking to such surface is scraped off to deposit, and then remain deposited, on an inner diametric portion of the cage 45 (a grease puddle G1). When the amount of grease so puddle becomes larger as a grease puddle (shown by the hatching) G2 shown in FIG. 23B, it comes to deposit in a shoulder of the inner ring 42. When puddle of the grease puddle G2 forms, it will collide against the preceding grease puddle G1 and then ride slantwise over it (a grease puddle G3) as shown in FIG. 23C and subsequently deposit onto the seal groove 49 incident to upwelling towards a central portion inside the respective pocket 51. Because of the deposit of the grease in the seal groove 49 in this way, the above discussed problems and inconveniences occur.

Also, the previously described iron made cage tends to involve generation of friction induced swarf of iron in sliding contact with a steel ball during the operation, which eventually leads to reduction in lifetime of the ball bearing assembly. In the event that a crown shaped, resin made cage is used, the lifetime will prolong, but deformation occurs during the high-speed operation under the influence of a centrifugal force and, therefore, the cage will contact an outer ring inner diametric surface and/or constrains the steel ball.

SUMMARY OF THE INVENTION

An object of the present invention is to provide a cage for a ball bearing assembly, in which grease will hardly deposit in a seal groove defined in a bearing raceway ring that rotates relative to the seal and in which leakage of the grease can be avoided, and also to provide a method of manufacturing such cage.

Another object of the present invention is to provide the cage for the ball bearing assembly, which can render the ball bearing assembly to have an extended lifetime by avoiding generation of friction induced swarf of iron in a cage pocket inner surface.

The cage for the ball bearing assembly according to the present invention is a ring shaped cage for the ball bearing assembly, which is ring-shaped and has a pocket for accommodating one of balls of the ball bearing assembly defined at a plurality of locations in a direction circumferentially thereof, and in which each of the pockets has an inner surface so shaped as to represent a concaved surface in which a portion on an inner diametric side of a pitch circle described by a circular row of the balls has its diameter gradually reduced towards a cage inner diametric side open edge, wherein the inner surface of each of the pockets is provided with a concaved portion extending from the open edge on the cage inner diametric side towards a cage outer diametric side. The shape of the concaved surface, which the diameter decreases as it approaches the cage inner diametric side open edge, is so chosen as to be, for example, a concaved spherical shape. The entire inner surface of each of the pockets may be so shaped as to represent a concaved spherical surface shape while a portion on an outer diametric side of the ball row pitch circle is rendered to be a concaved spherical shape. Other than this, that outer diametric side portion of the ball row pitch circle may be of, for example, a cylindrical surface shape, in which case the inner diametric side portion is chosen to be a conical surface shape. The sectional shape of the inner surface of the concaved portion in the cage circumferential direction (that is, the sectional shape sectioned along a plane perpendicular to the center axis of the cage) may be represented by an arcuate shape of a radius of curvature that is smaller than the radius of curvature of the concaved spherical surface defining the inner surface of the respective pocket.

In the present invention, the concaved portion may be provided at one location extending on both sides of the open edge of each of the pockets with respect to a center thereof in the cage circumferential direction and may have a width greater than half the width of each of the pockets in the cage circumferential direction, the concaved portion having an inner surface shape which represents a shape of a cylindrical surface generally occupying a portion of a contour of a virtual cylinder extending about a straight line in a radial direction of the cage, and in which the concaved portion extends from the open edge on the cage inner diametric side towards a position near the ball row pitch circle, getting gradually shallow in depth and narrow in width as it approaches from the cage inner diametric edge towards the ball row pitch circle.

Alternatively, in the present invention, the concaved portion may be provided at a plurality of locations on respective sides of the open edge of each of the pockets with respect to a center thereof in the cage circumferential direction and may have an inner surface shape representing a shape of a cylindrical surface generally occupying a portion of a contour of a virtual cylinder extending about a straight line in a radial direction of the cage, and in which the concaved portion extends from the open edge on the cage inner diametric side towards a position near the ball row pitch circle, getting gradually shallow in depth and narrow in width as it approaches from the cage inner diametric edge towards the ball row pitch circle.

Again alternatively, in the present invention, the concaved portion may be provided at two locations on respective sides of the open edge of each of the pockets with respect to a center thereof in the cage circumferential direction and extends to a position near a cage outer diametric edge, each of the concaved portions at those two locations being of a shape generally occupying a portion of a contour of one virtual ring, which virtual ring has a circular sectional shape at any arbitrary circumferential position and has a ring outer diameter sufficient to be accommodated within the corresponding pocket with a ring center inclined relative to a cage center axis.

In the present invention, the sectional shape of the inner surface of the concaved portion in the cage circumferential direction may not necessarily be limited to the arcuate sectional shape as hereinabove described, but may have any arbitrary sectional shape, for example, a polygonal sectional shape.

In the case of any one of the foregoing various constructions according to the present invention, the cage may comprises two annular cage halves, which are overlapped one above the other in a fashion axially opposed relative to each other, in which each of those cage halves is of a configuration having a plurality of spherical shell shaped plate segments, each having an inner surface defining half of the respective pocket, and flat plate segments, each defining an area between the neighboring pockets, the spherical shell shaped plate segments and the flat plate segments alternating one after another in a direction circumferentially thereof. Each of the spherical shell shaped plate segments forms a part of a ball shell and is represented by a countersunk swelling portion having its inner and outer surfaces representing a spherical shape.

In the ball bearing assembly of the type, in which the conventional cage of a standard shape including the pockets each having a spherical inner surface is used, when the balls forming the rolling elements roll along the inner ring raceway surface, the thickness of the grease on the inner ring raceway surface comes to be symmetrical in an axial direction with respect to a center of the Hertz contact and, also, the thickness of the grease on the ball surfaces comes to be symmetrical from the center of the Hertz contact to an inner ring raceway surface width. As the grease sticking to the ball surfaces enters the cage by the effect of the rotation of the balls, the grease is scraped off by the cage. Although the grease so scraped off deposits on the cage, when the amount of this grease increases, a portion thereof deposits also on an inner ring shoulder. As more grease deposits on the inner ring shoulder, the grease comes to deposit on and ride over the vicinity of a pocket center portion of the rotating cage. When the grease then riding over increases, it comes to jostle with the grease in the inner ring shoulder with the grease being consequently deposited to the inner ring seal groove. This is the movement of the grease occurring in the standard iron plate blanked cage. Also, in this cage of the standard shape, the grease deposited at a cage pocket center portion sticks to a seal inner surface. Hence, the grease incapable of contributing directly to lubrication will remain on the seal inner surface. Also, shearing of the grease occurs in the cage pocket portion and the seal inner surface, resulting in increase of the torque of the bearing assembly.

However, since in the practice of the present invention the inner surface of each of the pockets is provided with the concaved portion extending from the open edge on the cage inner diametric side towards the cage outer diametric side, no grease deposits on the inner shoulder portion. In other words, since there is provided the concaved portion in the open edge on the cage inner diametric side, where the grease tends to be most deposited on the respective ball, scraping of the surface of the respective ball decreases and the amount of grease accumulated in the cage inner diametric surface decreases correspondingly. For this reason, the grease will hardly deposit in the inner seal groove and, even though either the contact type seal or the non-contact type seal is employed, the leakage of grease can be avoided. This effect occurs especially when the outer ring rotates. Also, since there is no need to provide the seal with any additional feature to avoid the grease leakage, it is possible to design a seal having a resistance to muddy water, a resistance to dust and being customized to achieve low torque (small rotational resistance). When such a low torque seal and the cage of the present invention are combined together, the bearing assembly free from the grease leakage and of a low torque can be obtained.

Where the sectional shape of the inner surface of the concaved portion along the cage circumferential direction is so chosen as to be of an arcuate shape having the radius of curvature smaller than that of the concaved spherical surfaced defining the inner surface of each of the pockets, not only does the scraping of the grease hardly occur as hereinabove described, but also it is desirable in terms of the strength of the cage.

In the present invention, in the case where the two cage halves are employed to construct the cage, each of the two cage halves may be a press molded product of a metal plate. In other words, the type of the so-called iron plate blanked cage may be employed.

The shape of each of the pockets in the cage according to the present invention can be molded by means of a press work applied to a metallic plate and, where the press work is employed, a low cost and a high strength can be achieved and, as compared with the standard iron plate blanked cage, the distance to the seal does not change.

It is to be noted that the bearing ball cage of the present invention can be applied to the resinous cage or the like of a two component type, other than the iron plate blanked cage.

In the present invention, where the inner surface of each of the pockets is made to represent a spherical shape, the depth of the concaved portion may preferably be so chosen that the distance from a center of the concaved spherical surface defining the inner surface of each pocket to the deepest position of the concaved portion is equal to or greater than 1.05 times a radius of each of the balls. As a result of test, it has been ascertained that if the distance to the above described deepest position is equal to or greater than 1.05 times the radius of the respective ball, deposition of grease in the inner ring seal groove does not occur.

In the bearing ball cage of any one of the foregoing constructions designed in accordance with the present invention, where the cage is made of a metallic material such as, for example, iron or the like, the inner surface of each of the pockets may be formed with a film (coating). This film may be of any kind provided that it serves to prevent generation of friction induced swarf of iron which would result from contact between the balls and the cage made of the metallic material and may be made of, as a principal component, one of resins including, for example, PTFE, nylon and polyimide, one of solid lubricant materials including, for example, molybdenum disulfide, tungsten disulfide and graphite, or one of soft metals including, for example, copper, silver, tin and aluminum. This film is preferably applied to the entire region of the inner surface of each of the pockets, where it contacts the balls. This film need not be formed in the inner surface of the concaved portion. Formation of the film on the pocket inner surface avoid a metal-to-metal contact between the pocket inner surface portion and steel balls forming the balls and, therefore, generation of the friction induced swarf of the metallic material such as, for example, iron or the like can be avoided. For this reason, if the bearing ball cage of this construction is employed, the bearing assembly can have an extended lifetime.

The method of manufacturing a bearing ball cage of the present invention is a manufacturing method applicable where of the various bearing ball cages of the present invention, the bearing ball cage is in the form of a press molded article of the metal plate referred to above.

This manufacturing method includes preparing a convex press die for defining an inner surface of each of the spherical shell shaped plate segments of the cage halves and a concave press die for defining an outer surface of each of the spherical shell shaped plate segments, in which the convex press die has a molding surface representing a convexed spherical surface shape following the concaved spherical surface defining the inner surface of each of the pockets and also representing a shape following the concaved portion; pressing a ring shaped metal band, while the latter is sandwiched between the convex press die and the concave press die, to thereby form each of the cage halves; and joining the resultant cage halves together to complete the bearing ball cage.

In the case of molding of each of the cage halves, the inner surface of its spherical shell shaped plate segment has such a shape that a portion of a simple semispherical concaved surface includes the concaved portion of an arcuate sectional shape. With the press molding of such a composite shape, it is a general practice to press mold the concaved portion in that portion of the semispherical concaved surface after the simple semispherical concaved surface has been molded by a finishing press step and, in such case, as compared with the molding of the conventional iron plate blanked cage, the manufacturing process requires addition of one extra method step.

However, in the present invention, since that portion of the spherical convexed surface of the convex press die is of a shape having a concaved portion defining die portion corresponding to the concaved portion in each of the pockets, the concaved portion can be molded simultaneously during the finishing press step and, therefore, there is no need to increase the number of the manufacturing steps, allowing the cage to be manufactured efficiently.

In the present invention, the convex press die may be surface treated by means of shot blasting, grinding with use of electron beams or lapping by spraying of an abrasive material.

Since the shape and the surface roughness of the convexed semispherical surface of the convex press die used during the finishing press step are transcribed onto the inner surface of the cage pocket and such pocket inner surface contacts the corresponding ball when it is incorporated in the bearing assembly, it is necessary for the surface roughness of the pocket inner surface to be minimized. Since in the conventional iron plate blanked cage, the pocket inner surface represents a simple concaved spherical surface, the convexed semispherical surface of the convex press die is ground with the use of a concave shaped grindstone to minimize the surface roughness. However, in the case of the present invention, the convexed semispherical surface of the convex press die is of a shape, in which a portion of the simple convexed semispherical surface has a concaved portion defining die segment corresponding to the concaved portion in the pocket inner surface as hereinbefore described, and, therefore, it is not possible to minimize the surface roughness when it is ground with the use of a concave shaped grindstone such as practiced in the conventional art.

In view of the foregoing, if the molding convexed spherical surface of the convex press die used in the practice of the finishing press step is surface finished by means of shot blasting, or electron beam grinding or lapping by spraying of an abrasive material, no manual grinding is required and the surface roughness of the molding convexed spherical surface of the convex press die can be minimized with no fluctuation at a reduced cost.

The lapping in this case may be preferably carried out by adding a water content to abrasive particles to provide the polishing agent having an elasticity and adhesion and applying the resultant polishing agent to a surface of the die, which is an object to be processed, to allow the grinding particles to glide along such die surface with high speed so that the surface can be eventually finished by the effect of a frictional force generated as a result of the grinding particles gliding along the surface.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
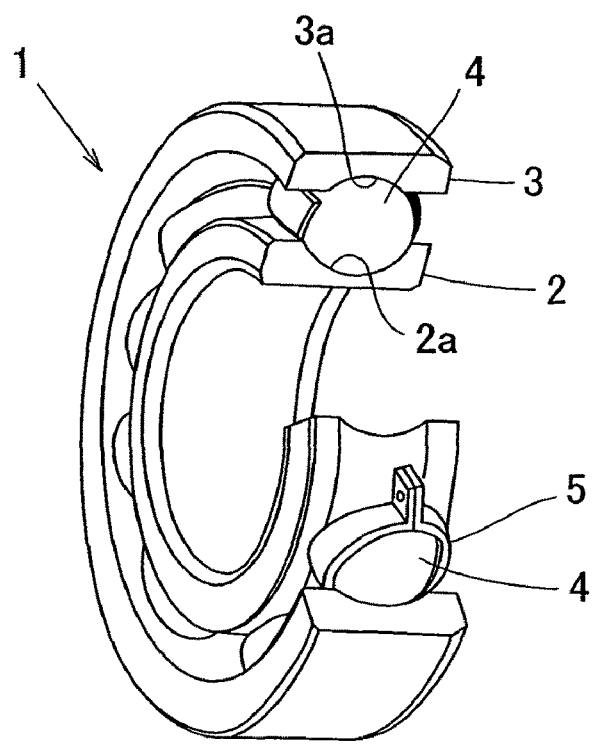
FIG. 1 is a perspective view, with a portion cut away, of a ball bearing assembly having a bearing ball cage according to a preferred embodiment of the present invention incorporated therein.
Figure 2:
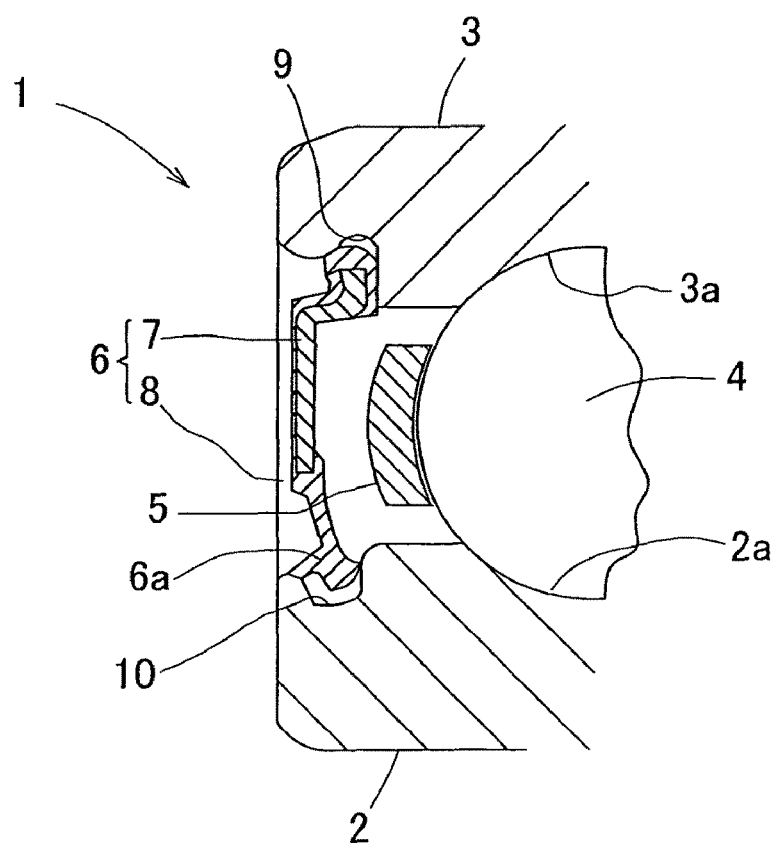
FIG. 2 is a fragmentary enlarged sectional view of the ball bearing assembly.

A preferred embodiment of the present invention will be described in detail with reference to the accompanying drawings. FIGS. 1 and 2 are a partially cutaway perspective view and a fragmentary enlarged sectional view, both showing a ball bearing assembly to which a bearing ball cage according to this embodiment is applied. The illustrated ball bearing assembly 1 is in the form of a sealed deep groove ball bearing and includes a plurality of balls 4 interposed between opposed raceway surfaces 2a and 3a defined respectively in an inner ring 2 and an outer ring 3, a cage 5 for retaining those balls 4, and contact seals 6 for sealing opposite ends of an annular space delimited between the inner and outer rings 2 and 3. Each of the balls 4 is in the form of a steel ball. Each of the contact seals 6 includes an annular core metal 7 and a rubberlike member 8 integrally fixed to the core metal 7 and has its outer peripheral portion snugly and neatly engaged in a respective seal mounting groove 9 defined in an inner peripheral surface of the outer ring 3. The inner ring 2 is formed with a seal groove 10 in the form of a circumferentially extending groove defined at a location corresponding to an inner periphery of each of the contact seals 6 and a sealing lip 6a formed at an inner peripheral side end of the respective contact seal 6 is slidingly engaged in the seal groove 10 in the inner ring 2.

Figure 3:
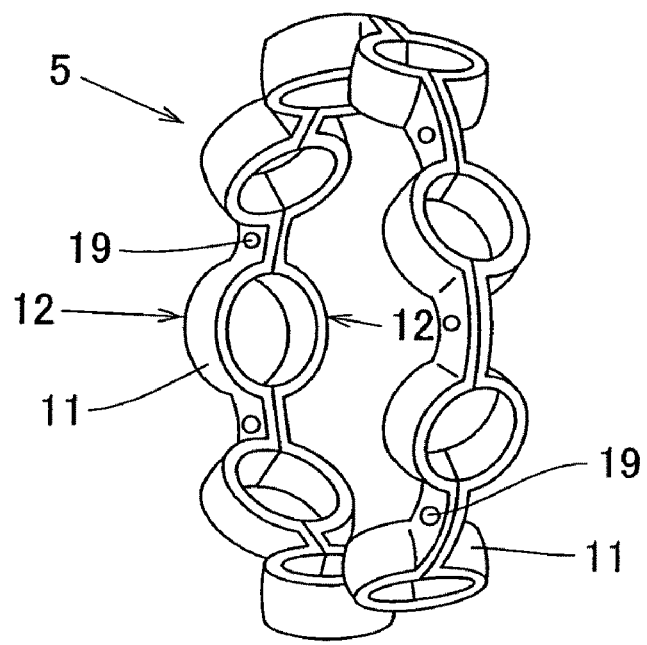
FIG. 3 is a perspective view of the bearing ball cage according to this embodiment.
Figure 4:
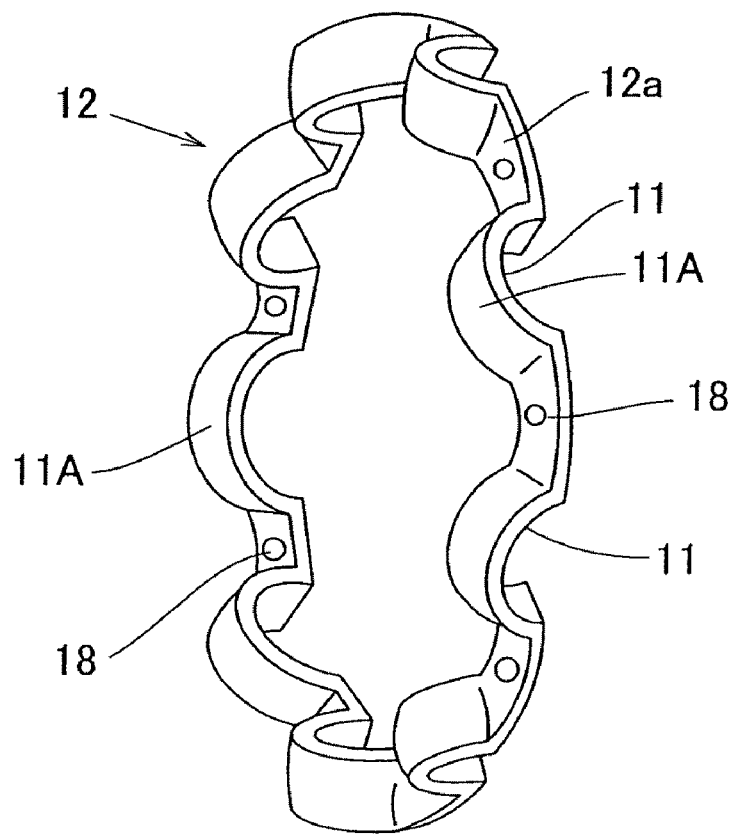
FIG. 4 is a perspective view of one of two halves of the bearing ball cage, which is a component part of the bearing ball cage.

As best shown in FIG. 3, the cage 5 is of a ring shaped configuration and has a pocket 11 for retaining a corresponding ball 4 therein, which is defined at a plurality of locations thereof in a direction circumferentially thereof, in which the respective pocket 11 has an inner surface shaped to represent a concaved spherical surface. This cage 5 is made up of two annular cage halves 12, best shown in FIG. 4 in a perspective representation, which are overlapped one above the other in a fashion axially opposed relative to each other and are subsequently joined together to be an integral unit by means of rivets 19 passed through respective rivet holes 18. Each of the cage halves 12 is of a configuration having a plurality of spherical shell shaped plate segments 11A, each having an inner surface defining half of the respective pocket 11, and flat plate segments 12a, each defining an area between the neighboring pockets 11, in which the flat plate segments 12a and the next adjacent spherical shell shaped plate segments 11A alternate one after another in a direction circumferentially thereof Each of the spherical shell shaped plate segments 11A referred to above forms a part of a sphere shell and represents, in other words, a swelled portion of a countersunk shape having inner and outer surfaces thereof that are shaped spherically. Each of the cage halves 12 when projected in an axial direction thereof represents a ring shape, which has a width in a radial direction thereof that is constant over the entire circumference thereof.

Figure 5:
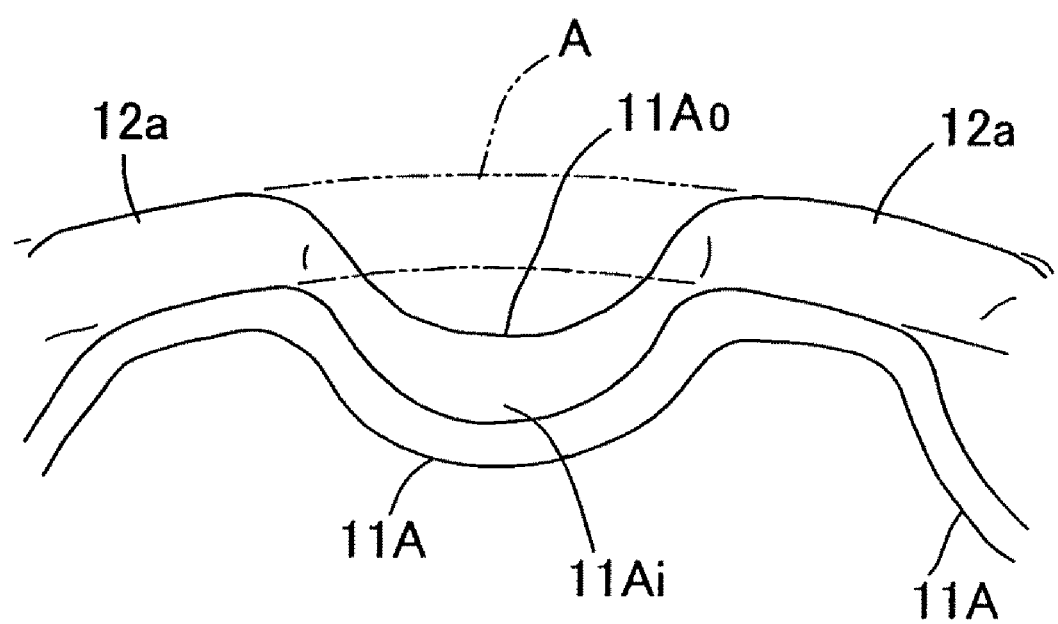
FIG. 5 is a fragmentary enlarged perspective view of a portion of one of the cage halves, showing the shape of one of the pockets shown as simplified.
Figure 6A:
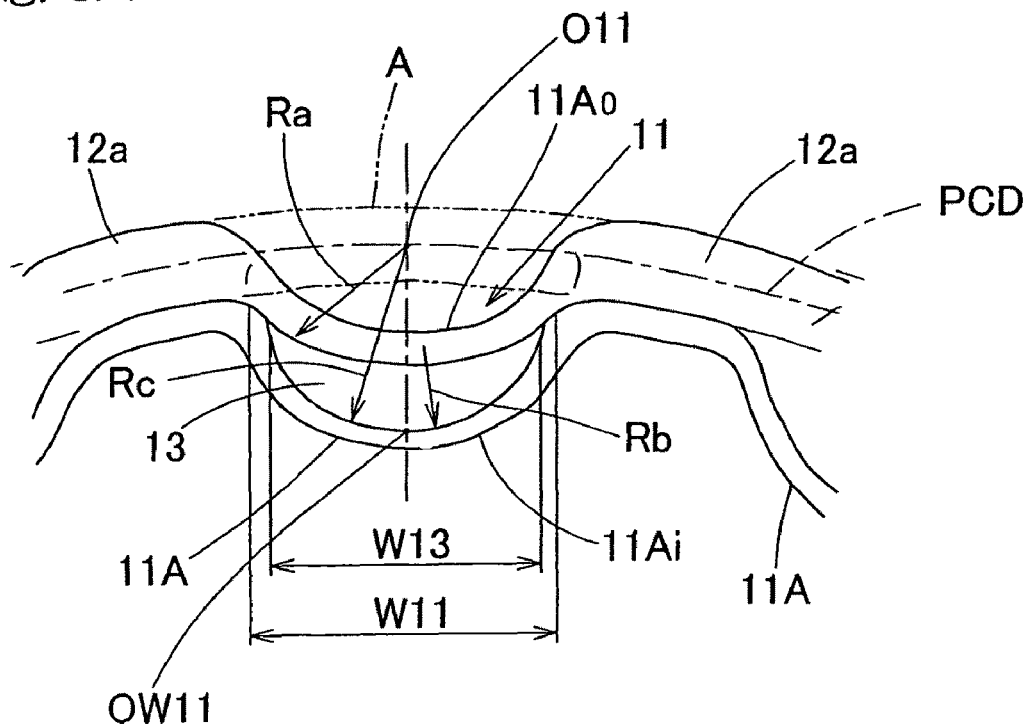
FIG. 6A is a fragmentary enlarged perspective view showing one example, in an exaggerated form, of an inner surface of a spherical shell shaped plate segment employed in one of the cage halves.
Figure 6B:
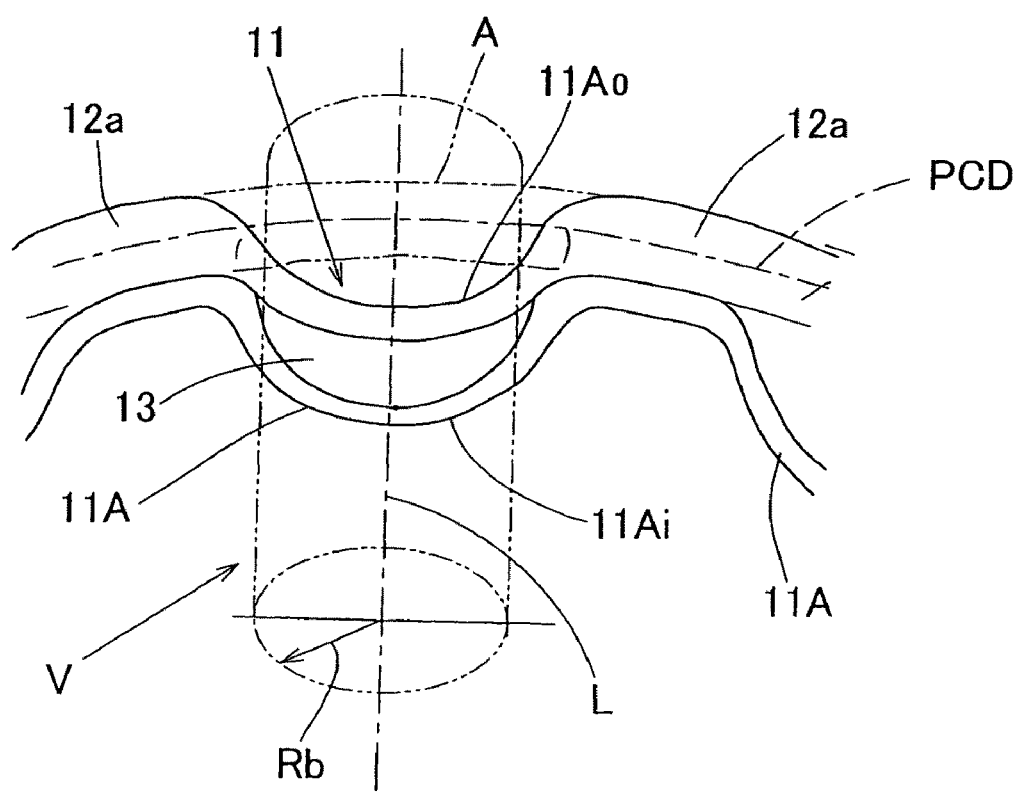
FIG. 6B is a perspective view showing a condition in which the phantom cylinder is added to the perspective view.

FIGS. 6A and 6B are perspective views of a portion of each of the cage halves 12 on an enlarged scale. FIG. 5 is a diagram showing a portion corresponding to that shown in FIGS. 6A and 6B, but in which a pocket inner surface is represented by a simple spherical surface. Referring to FIG. 5, a region A shown by the double dotted chain line represents a circumferential region of the respective cage half 12, in which the flat plate segments 12a are arranged in a direction circumferentially thereof The spherical shell shaped plate segments 11A, each defining half of the corresponding pocket 11, are formed in portions which are not occupied by the flat plate segments 12a arranged in the circumferential region A. One side of each of the spherical shell shaped plate segments 11A shown therein forms an inner diametric side portion 11Ai of the cage 5, whereas the opposite side of each of the spherical shell shaped plate segments 11A forms an outer diametric side portion 11Ao of the cage 5.

Each of the pockets 11 (spherical shell shaped plate segment 11A) in the cage 5 according to the embodiment now under discussion has an inner surface so shaped and so configured that as shown in FIGS. 6A and 6B, in the above described inner diametric side portion 11Ai of the cage 5, a concaved portion (a recessed portion) 13 extending from an open edge on a cage inner diametric side towards a cage outer diametric side is provided and has a sectional shape taken along an inner surface of the concaved portion 13 in a cage circumferential direction (that is, a sectional shape taken along a plane perpendicular to the center axis of the cage), which shape is represented by an arcuate shape of a radius of curvature Rb that is smaller than the radius of curvature Ra of a concaved spherical surface defining the inner surface of the respective pocket 11.

The concaved portion 13 referred to above is provided at one location extending from the center OW11 of the open edge of the respective pocket 11 in both directions circumferentially of the respective pocket 11 and has a width W13 occupying a substantially whole of the width W11 of the respective pocket 11 in the cage circumferential direction. This width W13 of the concaved portion 13 is preferably larger than half the width W11 of the respective pocket 11 and is more preferably equal to or larger than ⅔ or ¾ of the width W11.

As best shown in FIG. 6B, the inner surface of the concaved portion 13 is represented by a cylindrical surface which generally forms a part of the contour of the virtual cylinder V aligned with a straight line L extending radially of the cage 5. The virtual cylinder V referred to above may be represented by a surface of a grindstone used to grind, or otherwise, process the concaved portion 13. This concaved portion 13, when viewed in the cage radial direction, is of a shape extending from the open edge on the cage inner diametric side towards a pitch circle diameter PCD depicted by a circular row of the balls and gradually getting small from a cage inner diametric edge towards the ball row pitch circle diameter PCD, that is, gradually getting shallow in depth and narrow in width. In the embodiment now under discussion, this concaved portion 13 extends exactly to the ball row pitch circle diameter PCD, but it may extend to the cage outer diametric side somewhat beyond the ball row pitch circle diameter PCD or may terminate slightly before the ball row pitch circle diameter PCD. It is to be noted that the ball row pitch circle diameter PCD is also referred to as the pocket PCD.

The concaved portion 13 has a depth so chosen that the distance Rc from the center O11 of the sphere representing a part of the concaved spherical surface that defines the pocket inner surface to the deepest position of the concaved portion 13 is greater than 1.05 times the radius of each ball 4 (or may be exactly 1.05 times the radius of each ball 4). The radius of curvature Ra of the concaved spherical surface representing the inner surface of each pocket 11 is so chosen as to be slightly greater than the radius of the ball 4 and smaller than 1.05 times the radius of the ball 4.

Figure 7A:
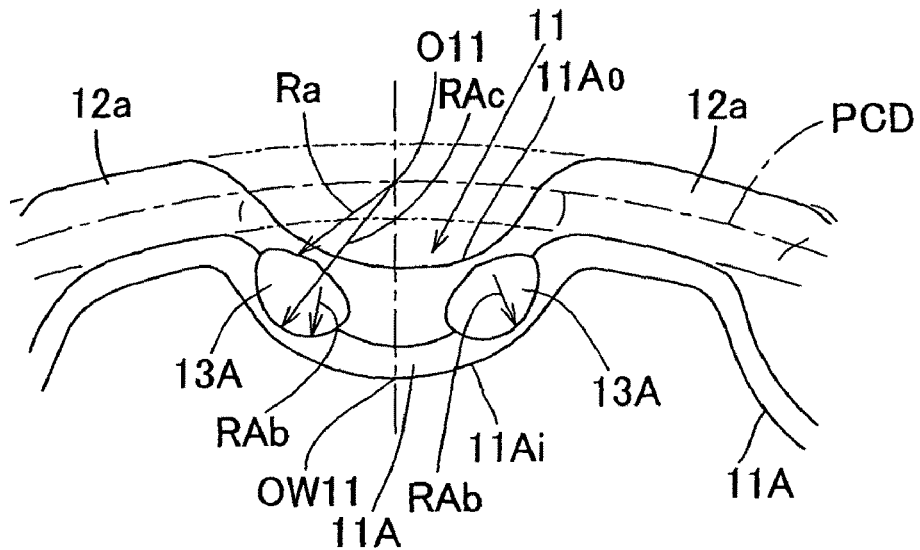
FIG. 7A is a fragmentary enlarged perspective view showing another example, in an exaggerated form, of the inner surface of the spherical shell shaped plate segment employed in one of the cage halves.
Figure 7B:
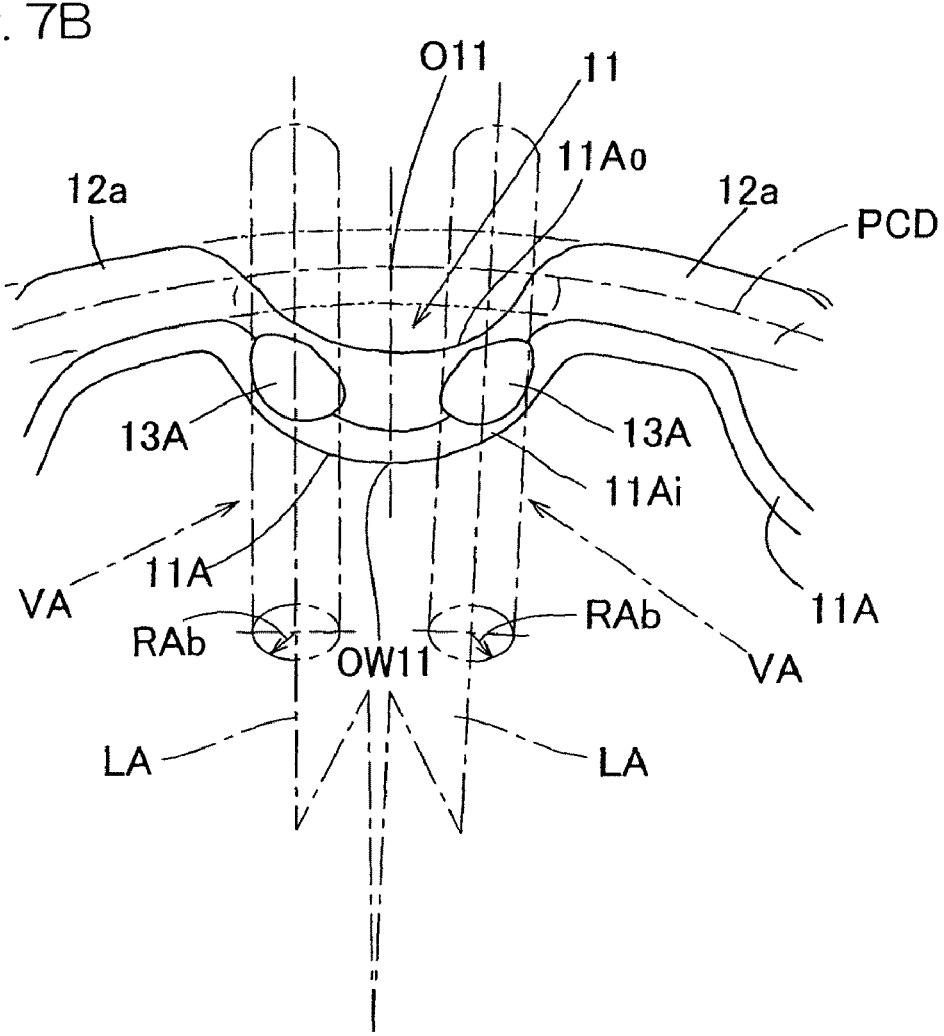
FIG. 7B is a perspective view showing the condition in which the phantom cylinders are added to the perspective view.

FIGS. 7A and 7B illustrate another example of the shape of the inner surface of the respective pocket 11 (spherical shell shaped plate segment 11A) in the cage 5. In this example, a concaved portion 13A defined in the inner diametric side portion 11Ai in the inner surface of the respective pocket 11 (spherical shell shaped plate segments 11A) is provided at two locations, each on one of the respective opposite sides of the open edge of the pocket 11 with respect to the center OW11 of the cage circumferential direction. Each of those concaved portions 13A has a sectional shape taken along the cage circumferential direction (that is, a sectional shape taken along a plane perpendicular to the center axis of the cage), which shape is represented by an arcuate shape of a radius of curvature RAb that is smaller than the radius of curvature Ra of a concaved spherical surface defining the inner surface of the respective pocket 11 and, more specifically, by a cylinder surface shape which generally forms a part of the contour of the virtual cylinder VL aligned with a straight line L extending a radial direction of the cage 5 as shown in FIG. 7B. The respective concaved portion 13A is of such a shape as to extend from the open edge on the cage inner diametric side towards the vicinity of a pitch circle diameter PCD depicted by the circular row of the balls, gradually getting small from a cage inner diametric edge towards the ball row pitch circle diameter PCD, that is, gradually getting shallow in depth and narrow in width.

The two concaved portions 13A are at the two locations symmetric relative to each other at 40°±5° in angle of orientation in the circumferential direction about the center OW11 of the open edge of the respective pocket 11 in the cage circumferential direction. Also in the illustrated example, the respective concaved portions 13A has a depth so chosen that the distance RAc from the center O11 of the sphere representing a part of the concaved spherical surface that defines the pocket inner surface to the deepest position of the respective concaved portion 13A is greater than 1.05 times the radius of each ball 4 (or may be exactly 1.05 times the radius of each ball 4).

It is to be noted that although in this embodiment, the concaved portion 13A has been shown and described as provided at two locations, it may alternatively be provided at three or more locations.

Figure 8A:
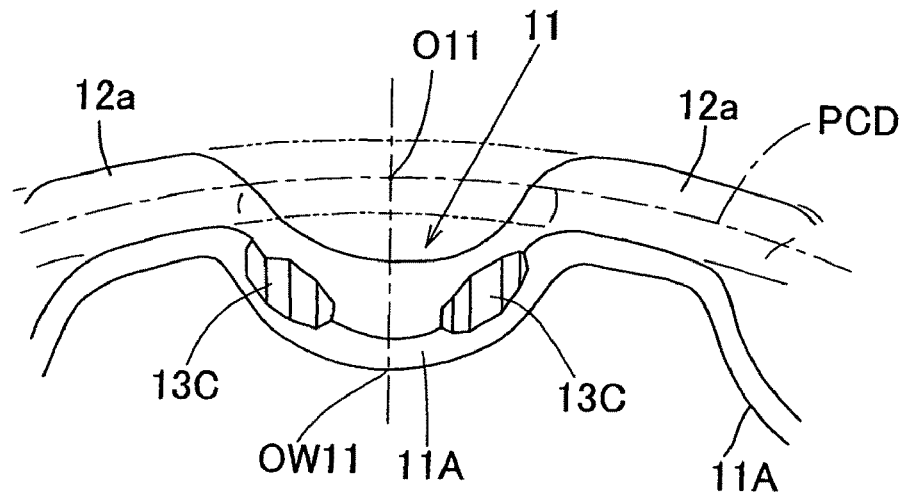
FIG. 8A is a fragmentary enlarged perspective view showing a further example, in an exaggerated form, of the inner surface of the spherical shell shaped plate segment employed in one of the cage halves.
Figure 8B:
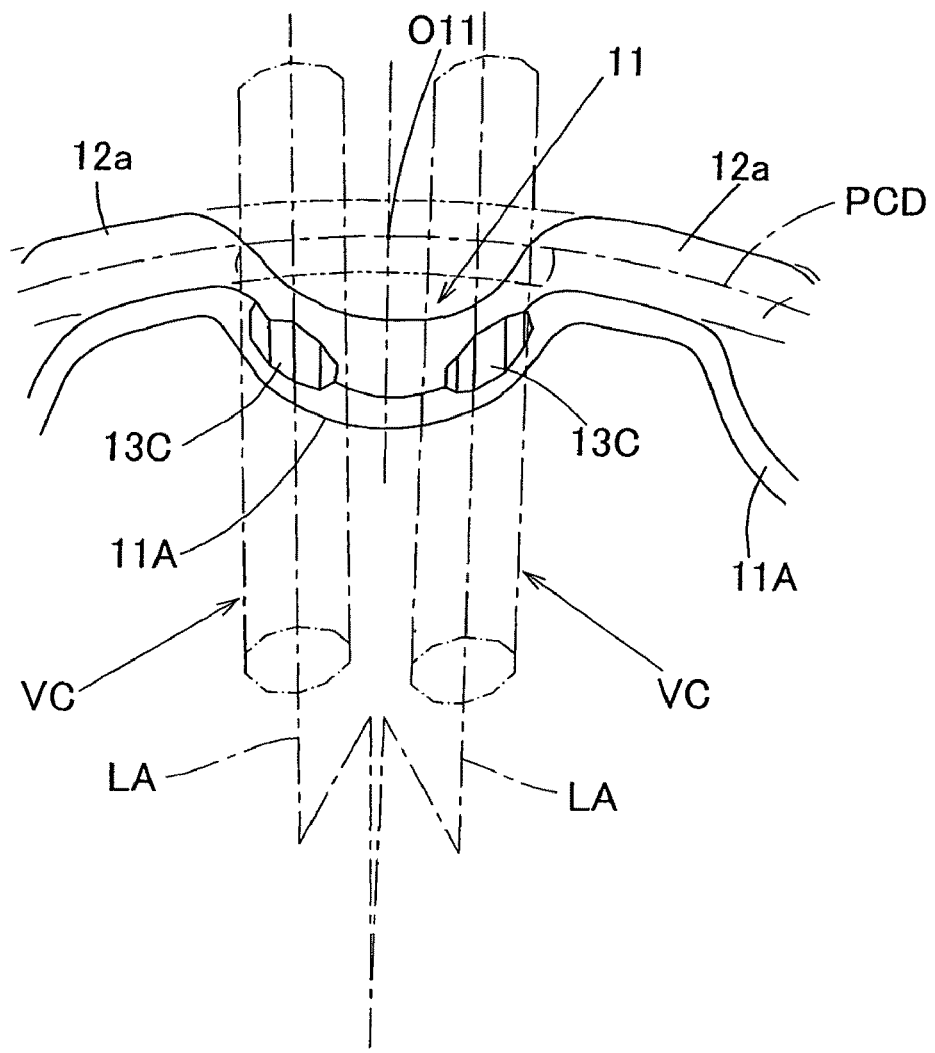
FIG. 8B is a perspective view showing the condition in which the phantom polygonal prisms are added to the perspective view.

FIGS. 8A and 8B illustrate a further example of the shape of the inner surface of the respective pocket 11 (spherical shell shaped plate segment 11A) in the cage 5. This example is similar to the embodiment shown in and described with particular reference to FIGS. 7A and 7B, but differs therefrom in that instead of the arcuate shapes (the sectional shape taken along the cage circumferential direction) of respective concaved portions 13C (13A), polygonal sectional shapes are employed. More specifically, as best shown in FIG. 8B, the respective concaved portion 13C takes a polygonal shape generally occupying a portion of the contour of a polygonal prism VC (for example, a right decagonal prism in the illustrated example) aligned with the straight line L extending in the radial direction of the cage 5. The respective concaved portion 13C extends from the open edge on the cage inner diametric side towards the vicinity of the pitch circle diameter PCD depicted by the circular row of the balls, gradually getting small from a cage inner diametric edge towards the ball row pitch circle diameter PCD, that is, gradually getting shallow in depth and narrow in width. Structural features of this embodiment other than those described above are similar to those shown in and described with particular reference to FIGS. 7A and 7B.

Figure 9A:
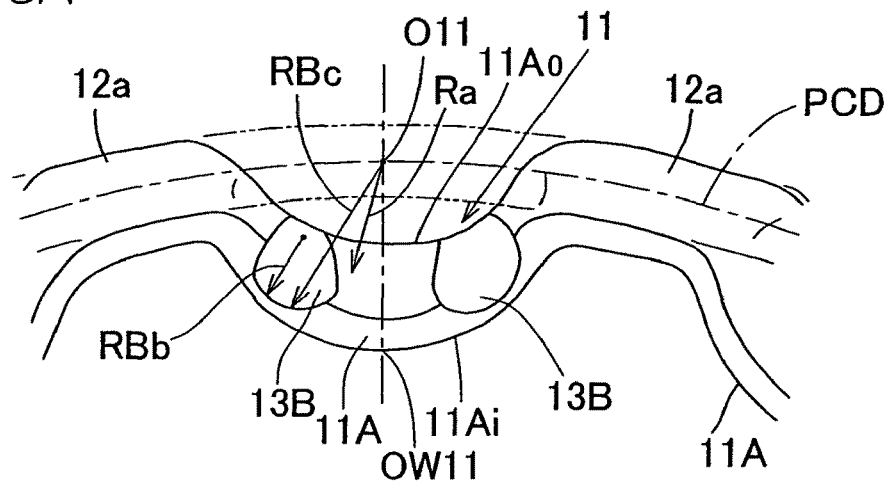
FIG. 9A is a fragmentary enlarged perspective view showing a still further example, in an exaggerated form, of the inner surface of the spherical shell shaped plate segment employed in one of the cage halves.
Figure 9B:
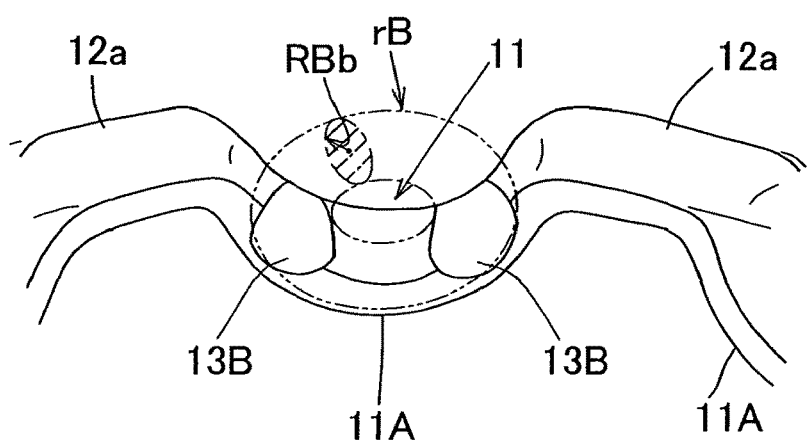
FIG. 9B is a perspective view showing the condition in which the phantom ring is added to the perspective view.

FIGS. 9A and 9B illustrate a yet further example of the shape of the inner surface of the respective pocket 11 (spherical shell shaped plate segment 11A) of the cage 5. This example is similar to the embodiment shown in and described with reference to FIGS. 7A and 7B in that a concaved portion 13B provided in the inner diametric side portion 11Ai of the inner surface of the respective pocket 11 (spherical shell shaped plate segment 11A) is provided at two locations, each on one of the respective opposite sides of the open edge of the pocket 11 with respect to the center OW11 of the cage circumferential direction, but differs therefrom in that the respective concaved portion 13B extends to the vicinity of the cage outer diametric edge. The respective concaved portions 13B has an inner surface so shaped and so configured as to represent a sectional shape taken along the cage circumferential direction, which is of an arcuate shape having a radius of curvature RBb smaller than the radius of curvature Ra of the concaved spherical surface defining the inner surface of the respective pocket 11 and represent, more specifically, a shape which generally forms a part of the contour of the virtual ring VB as shown in FIG. 8B.

Figure 10:
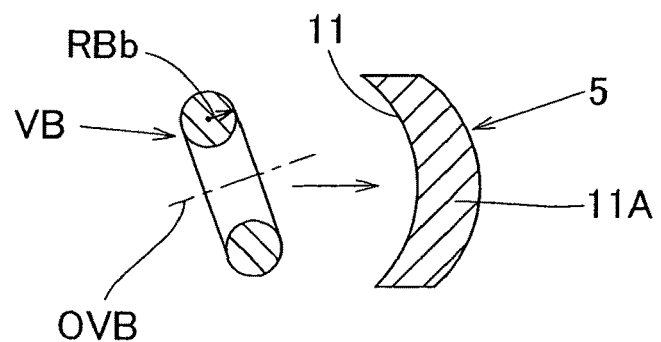
FIG. 10 is an explanatory diagram showing the relation between the spherical shell shaped plate segment and the phantom ring in a sectional representation.
Figure 10:
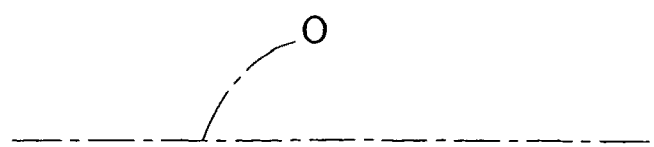

This virtual ring VB referred to above may represent a surface of a grindstone used to grind, or otherwise, process the concaved portions 13. The virtual ring VB referred to above has a ring outer diameter sufficient to be encompassed within the respective pocket 11 and is of an annular shape having a sectional shape at any circumferential location thereof representing a round shape and also has a ring center OVB inclined relative to the cage center axis O as shown in FIG. 10.

It is to be noted that in the practice of the present invention, the sectional shape of the concaved portion 13A to 13C taken along the cage circumferential direction may not be limited to that shown in and described with particular reference to the respective examples of FIGS. 7A to 9B and may be of a partial oval shape, a rectangular grooved shape, a trapezoidal grooved shape or any other arbitrary shape. Also, the sectional shape of the concaved portion 13A to 13C may be asymmetrical with respect to the center thereof.

The shape of the inner surface of the respective pocket 11 may not be limited to a spherical shape and may be of any suitable shape as long as a portion on the inner diametric side inwardly of the ball row pitch circle diameter PCD has a diameter gradually decreasing towards the cage inner diametric side open edge. For example, a portion on the outer diametric side of the ball row pitch circle diameter PCD may represent a cylindrical shape whereas the portion on the inner diametric side thereof may represent a conical shape.

Figure 11A:
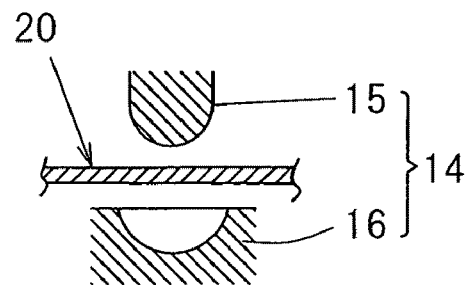
FIGS. 11A to 11D are explanatory diagrams showing a process of manufacturing the bearing ball cage according to this embodiment.
Figure 11B:
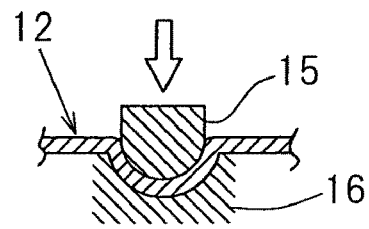

FIGS. 11A to 11D illustrate a method of manufacturing the cage 5 of the kind described hereinabove. This manufacturing method is a method of manufacturing the iron plate blanked cage and, at the outset, a steel plate is pressed so that a ring shaped metal band 20 can be blanked. Subsequently, as shown in FIG. 11A, using a press mold set 14 including a convex press die 15 for defining the inner surface of each of the spherical shell shaped plate segments 11A of the cage half 12 and a concave press die 16 for defining an outer surface of each of the spherical shell shaped plate segments 11A, the ring shaped metal band 20 referred to previously is sandwiched between the convex press die 15 and the concave press die 16 so that the cage half 12 can be press molded as shown in FIG. 11B. This press molding may be carried out in two stage sequence including a rough press and a finishing press or may be carried out all at once.

It is to be noted that although in the figures one convex press die 15 and one concave press die 16 have been shown and described as employed, a press mold set of a kind, in which a plurality of convex press dies 15 and a corresponding number of concave press dies 16, both equal in number to the spherical shell shaped plate segments 11A employed in the cage half 12, are arranged in a direction circumferentially thereof as a press die unit, may be employed so that the plural spherical shell shaped plate segments 11A can be molded all at one time.

Figure 11C:
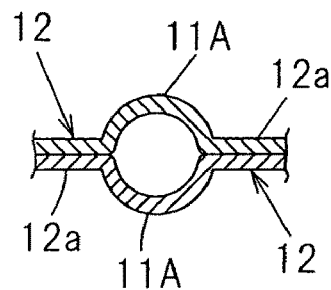
Figure 11D:
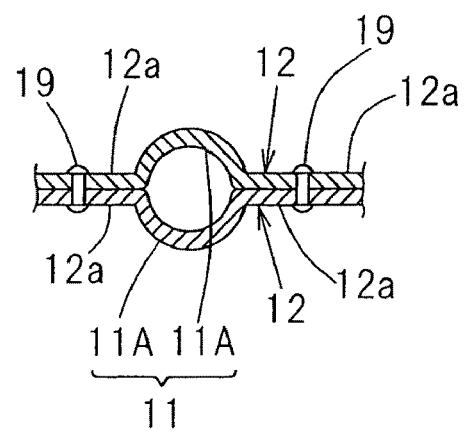

Two cage halves 12 obtained in the manner hereinabove described are overlapped together as shown in FIG. 11C and are subsequently joined together by means of rivets 19 tying the flat plate segments 12a of the respective cage halves 12 together, thereby completing the cage 5 as shown in FIG. 11D.

Figure 12:
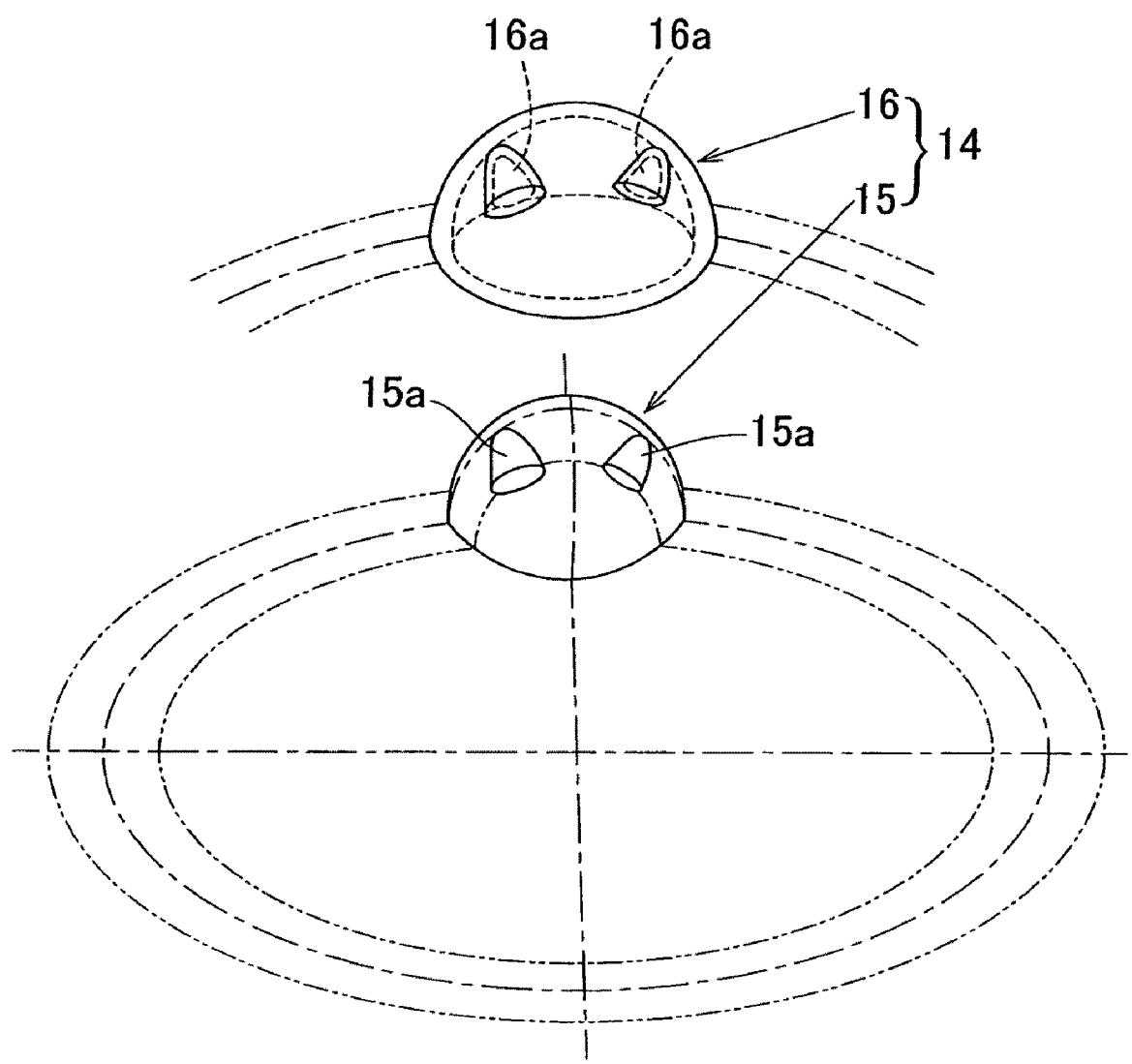
FIG. 12 is a perspective view showing a press mold set that is employed in the practice of the manufacturing process.

FIG. 12 illustrates a convex press die 15 and a concave press die 16 for use in a finishing press step of the press molding, which are specifically designed for use in press molding of the cage half 12 shown in and described with particular reference to FIGS. 7A and 7B. The convex press die 15 has a convexed semispherical surface partially formed with a concaved portion defining die segment 15a for forming the inner surface of the corresponding concaved portion 13A in the respective pocket 11 (spherical shell shaped plate segment 11A). On the other hand, the concave press die 16 is partially formed with a concaved portion rear surface defining die segment 16a for forming the outer surface of the corresponding concaved portion 13A in the respective pocket 11 (spherical shell shaped plate segment 11A). Although this means that a projection is formed on an outer surface side of the cage pocket, there should be no functional problem provided that it would not contact the seal. The convex press die 15 and the concave press die 16 used in this case are also employed in the form of a plurality of convex press dies 15 and a corresponding number of concave press dies 16, both equal in number to the spherical shell shaped plate segments 11A employed in the cage half 12, which are arranged in a direction circumferentially thereof as a press die unit, so that the plural spherical shell shaped plate segments 11A can be molded all at one time.

Where the cage half 12 shown in FIGS. 7A and 7B is to be molded, since the inner surface of the spherical shell shaped plate segment 11A is of a shape in which a part of a simple concaved semispherical surface has the concaved portions 13A, the manufacturing method requires an additional process step increased as compared with the conventional molding of the standard iron plate blanked cage in the case that after the simple spherical concaved surface has been formed during the finishing press step the concaved portions 13A are additionally press molded in part of the concaved semispherical surface.

In the embodiment now under discussion, however, the concaved portion defining die segment 15a for forming the inner surface of the corresponding concaved portion 13A in the respective pocket 11 (spherical shell shaped plate segment 11A) is formed in part of the convexed semispherical surface of the convex press die 15, which is used in the finishing press step, as hereinbefore described, and, therefore, the concaved portions 13A can be molded simultaneously during the finishing press step and, hence, with no need to increase the method steps in number, the cage 5 can be manufactured efficiently.

Also, since the shape and the surface roughness of the convexed semispherical surface of the convex press die 15 used during the finishing press step are transcribed onto the inner surface of the cage pocket 11 and such pocket inner surface contacts the corresponding ball 4 (FIG. 1) when it is incorporated in the bearing assembly, the surface roughness of the pocket inner surface is required to be minimized. Since in the conventional iron plate blanked cage, a pocket inner surface represents a simple concaved surface, the convexed semispherical surface of a convex press die is ground with the use of a concave shaped grindstone to minimize the surface roughness. However, in the case of this embodiment now under discussion, the convexed semispherical surface of the convex press die 15 is of a shape, in which a part of the simple convexed semispherical surface has a concaved portion defining die segment 15a corresponding to the concaved portion 13A in the pocket inner surface as hereinbefore described, and, therefore, it is not possible to minimize the surface roughness by grinding with the use of a concave shaped grindstone such as practiced in the conventional art.

In view of the foregoing, in the embodiment now under discussion, the molding convexed spherical surface of the convex press die 15 used in the practice of the finishing press step is surface finished by means of shot blasting, or electron beam grinding or lapping by spraying a polishing material. The lapping in this case is preferably carried out by adding a water content to abrasive particles to provide a polishing agent having an elasticity and an adhesion and by applying the polishing agent to a surface of the die 15, which is an object to be processed, to allow the abrasive particles to glide along such die surface so that the surface can be eventually finished by the effect of a frictional force generated as a result of the grinding particles gliding along the surface. For such a lapping, Aero Lapping (available from Kabushiki Kaisha Yamashita Works) can be employed, which is available in the market as an super mirror finishing apparatus for dies. As hereinabove described, by surface finishing the molding convexed spherical surface of the convex press die 15 by the use of the lapping technique, in which shot blasting, electron beam or spraying of the abrasive material is employed, no manual grinding is required and the surface roughness of the molding convexed spherical surface of the convex press die 15 can be minimized with no fluctuation and at a reduced cost.

Figure 22:
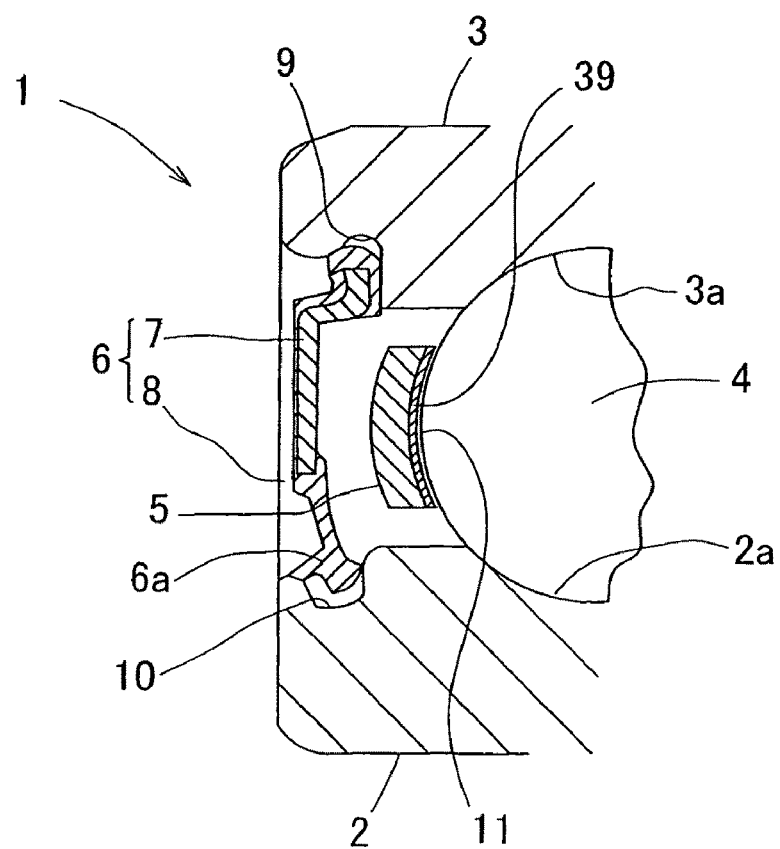
FIG. 22 is a fragmentary enlarged sectional view showing the ball bearing assembly having incorporated therein the bearing ball cage according to another preferred embodiment of the present invention.

It is to be noted that although in describing any one of the foregoing embodiments, reference has been made to the cage 5 prepared from an iron portion such as, for example, steel plates, this cage 5 may have the inner surface of each of the pockets 11 coated with a resin film (applied with a resin coating) 39 as shown in, for example, FIG. 22. The example shown therein is of a design, in which in any one of the embodiments shown in and described with particular reference to FIGS. 1 to 6B, the resin film 39 is applied to the inner surface of each of the pockets 11.

As hereinabove described, formation of the resin film 39 on the inner surface of each of the pockets 11 is effective to avoid generation of friction induced swarf of iron (iron powder) since the contact between the inner surface of the pocket 11 and the surface of the corresponding ball 4 in the form of a steel ball is the contact between resin and metal such as iron. For this reason, the use of the bearing ball cage 5 of the structure described above is effective to result in a ball bearing assembly 1 of a long lifetime.

The range over which the resin film 39 is formed may be limited either only to the inner surface of each pocket 11, to the entire surface of the cage 11, or to the entirety of opposed surfaces of the respective two cage halves 12, that is, both the inner surface of each pocket 11 and the overlapping surfaces of the flat plate segments 12a. Material for the resin film 39 can be suitably employed in the form of a polyimide resin because of its excellent frictional resistance and peeling resistance. The resin film 39 may be formed on the opposed surfaces of the cage halves 12, while the latters are in a separate condition, by, for example, spraying a molten resin onto those opposed surfaces of the cage halves 12 by means of a spray gun, or by immersing the cage 5, while the cage halves 12 are in a separate condition or in a combined condition, into a resin bath so that a resin film can be hardened after the immersed cage 5 is removed out of the resin bath. Where it is immersed in the resin bath, although the molten resin may accumulate in a substantial amount within the concaved portion 13, a vessel accommodating therein the cage 5 or the cage halves 12 before the resin film hardens may be rotated so that the molten resin so accumulated within the concaved portion 13 can be expelled outwards by the effect of a centrifugal force. By so doing, it is possible to avoid any undesirable reduction in the prevention effect of grease deposition as a result of formation of the concaved portion 13, which would otherwise result from formation of the resin film 39 of a substantial thickness in the concaved portion 13.

It is to be noted that FIG. 22 illustrates the case in which in the embodiment shown in and described with particular reference to FIGS. 1 to 6B, the resin film 39 is employed, but in the case that a resin film is formed in each of the pockets in any of the other embodiments that have been shown in and described and the cage is made of metal such as, for example, iron, the lifetime of the bearing assembly can be extended as a result of the prevention of generation of friction induced swarf of iron in a manner similar to that described hereinabove.

While the foregoing is directed to the case in which the film formed on the pocket surface is of the resin system, an effect similar to that exhibited by the film of the resin system can be obtained as long as generation of the iron-to-iron friction induced swarf of metal can be avoided and, therefore, similar effects can also be achieved in the case that the film is of a kind containing as a principal component a solid lubricant such as, for example, molybdenum disulfide or graphite or a soft metal such as, for example, copper or silver. With the film of the solid lubricant, since the film wears out more selectively than the ball, it is possible to avoid generation of a friction induced swarf of the metal. With the film of the soft metal, the surface roughness of the film decreases with increase of the length of time over which the bearing assembly is operated and, hence a slight lubricant oil film present between the ball and the soft metal film comes to work effectively, thus avoiding generation of the friction induced swarf of the metal. In order for the film of the solid lubricant to be formed on the pocket, it is recommended, for example, to apply a thermosetting resin in liquid form mixed with a high concentration of the solid lubricant and then to sinter it to harden. In order for the film of the soft metal to be formed on the pocket, it is recommended to employ, for example, an electroplating method.

Figure 13:
FIG. 13 is an explanatory diagram showing results of the grease leakage test conducted on the ball bearing assembly having incorporated therein the cage of the structure shown in FIGS. 6A and 6B.
Figure 14:
FIG. 14 is an explanatory diagram showing results of the grease leakage test conducted on the ball bearing assembly having incorporated therein the cage of the structure shown in FIGS. 7A and 7B.
Figure 15:
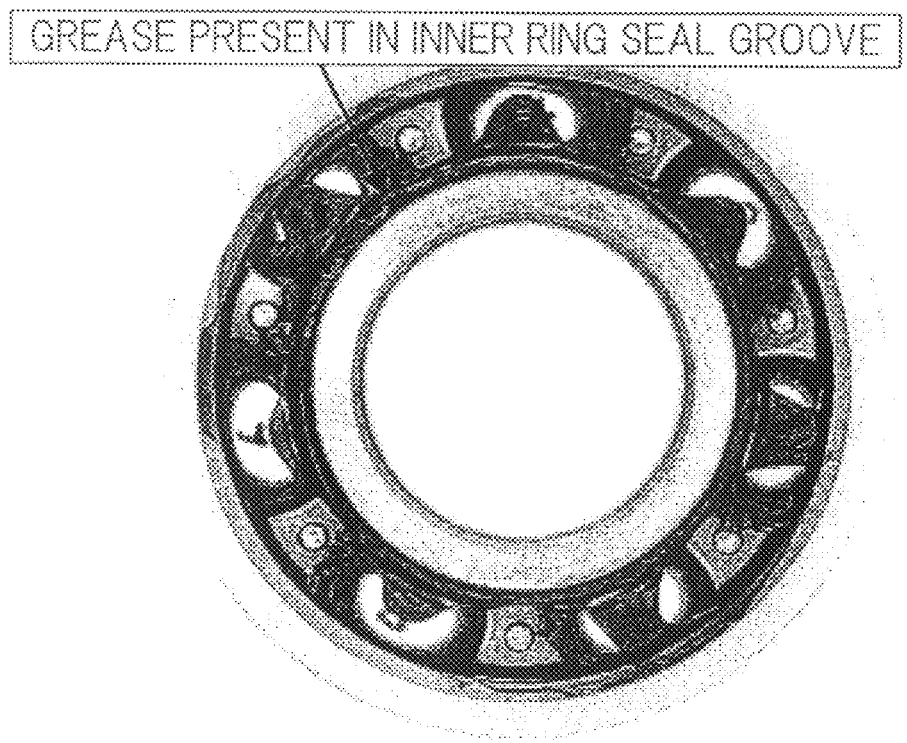
FIG. 15 is an explanatory diagram showing results of the grease leakage test conducted on the ball bearing assembly having incorporated therein the conventional cage manufactured by the use of the iron plate blanking technique.

FIGS. 13 to 15 illustrates the results of tests conducted to ascertain the condition of deposition of the grease. In those tests conducted, the ball bearing assembly having incorporated therein the cage 5 of the structure according to this embodiment (the embodiment shown in FIGS. 6A and 6B and the embodiment shown in FIGS. 7A and 7B) and the ball bearing assembly having incorporated therein the standard iron plate blanked cage were operated under the conditions as tabulated in Table 1 for comparison.

FIGS. 13 and 14 illustrates the condition of deposition of the grease in the ball bearing assembly utilizing the cage 5 of the structure according to this embodiment (the embodiment shown in FIGS. 6A and 6B and the embodiment shown in FIGS. 7A and 7B, respectively) whereas FIG. 15 illustrates the condition of deposition of the grease in the ball bearing assembly utilizing the standard iron plate blanked cage.

TABLE 1

| Bearing Number | 6203 |
|---|---|
| Seal | Not used |
| Rotatable Ring | Outer Ring |
| Rotational Speed (min$^{-1}$) | 3600 |
| Axial Load (N) | 39 |
| Operating Time (s) | 5 |
| Amt. of Grease Filled (mg) | 900 |
| Grease Consistency | 265 |

The results of tests shown in FIGS. 13 to 15 make it clear that in the ball bearing assembly (FIG. 15) having the standard iron plate blanked cage incorporated therein, the grease is deposited in the inner ring seal groove, but in the ball bearing assembly having the cage 5 of the structure according to this embodiment (respective examples of FIGS. 13 and 14), the grease did not deposit.

Also, a series of tests to ascertain the frequency of occurrence of the grease leakage were also conducted with contact seals ("LU Seal" available from NTN) incorporated in each of the ball bearing assemblies. Those tests were conducted with only the operating time in the conditions shown in Table 1 having been altered to 15 minutes. Results of those tests are shown in Table 2. The grease leakage in this case is defined as the leakage of the grease out of the bearing assembly occurring in a quantity of 30 to 100 mg that can be ascertained by visual observation.

TABLE 2

| Cage | Frequency of Leak Occurrence |
|---|---|
| Conventional | 9/10 |
| The Present Invention | 0/4 |

According to Table 2, it is clear that nine out of the ten sealed ball bearing assemblies each having the standard cage incorporated therein showed the occurrence of the grease leakage, but none of the four sealed ball bearing assemblies each having the cage 5 of the structure according to this embodiment incorporated therein showed the occurrence of the grease leakage.

Figure 23A:
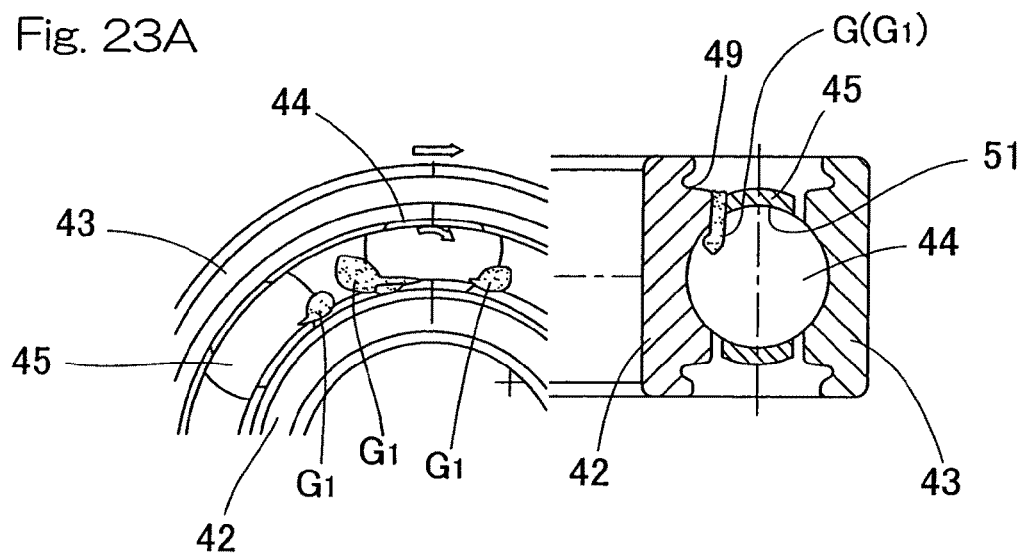
FIGS. 23A to 23C are explanatory diagrams showing how the grease is deposited in the conventional cage.
Figure 23B:
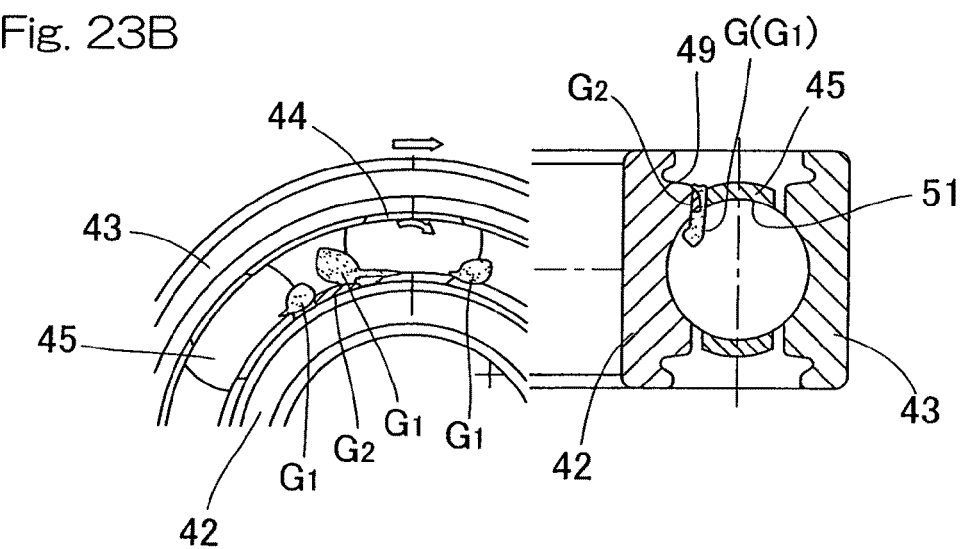
Figure 23C:
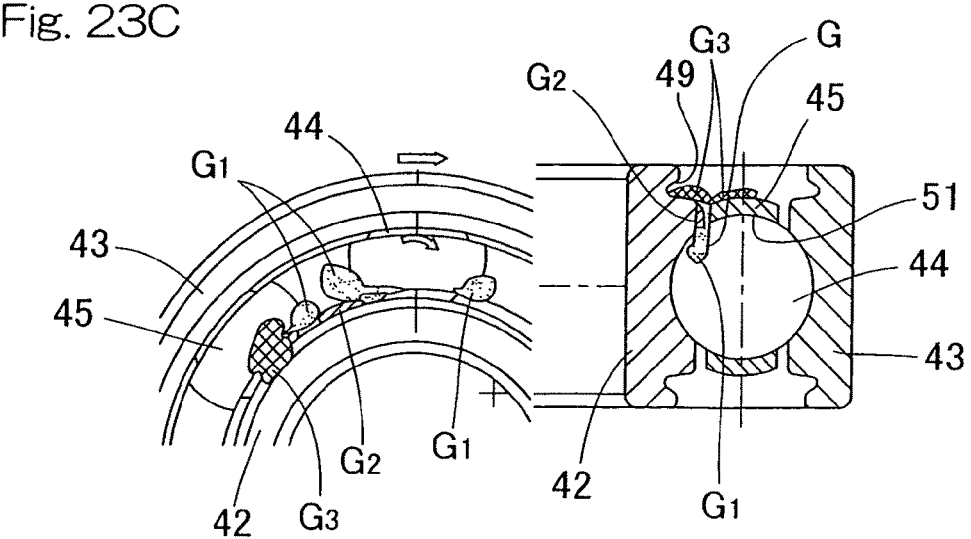

As can be readily understood from those results of the tests, since the bearing ball cage 5 according to this embodiment makes use of the pockets 11 that are different in shape from those in the conventional bearing ball cage, deposition of the grease in an inner ring shoulder can be eliminated. In other words, since the concaved portions are provided in the open edge on the cage inner diametric side, where the grease is the most likely to deposit, scraping of the ball surfaces, which occurs when the grease is to be scraped in the process as hereinabove described in connection with FIGS. 23A to 23C, is reduced. For this reason, no grease deposits in the inner ring seal groove and, even when any of the contact type and non-contact type seals is employed, no grease leakage occurs. This effect occurs especially when the outer ring rotates. Also, since there is no need to provide the seal with any additional feature to avoid the grease leakage, it is possible to design a seal having a resistance to muddy water, a resistance to dust and being customized to achieve low torque. When such a low torque seal and a cage 5 of the present invention are combined together, the bearing assembly free from the grease leakage and with a low torque can be obtained. Also, since a bearing ball cage 5 according to this embodiment can be press worked, a cage with a high strength can be manufactured at a low cost and, as compared with the standard iron plate blanked cage, the distance therefrom to the seal remains substantially the same.

Figure 16:
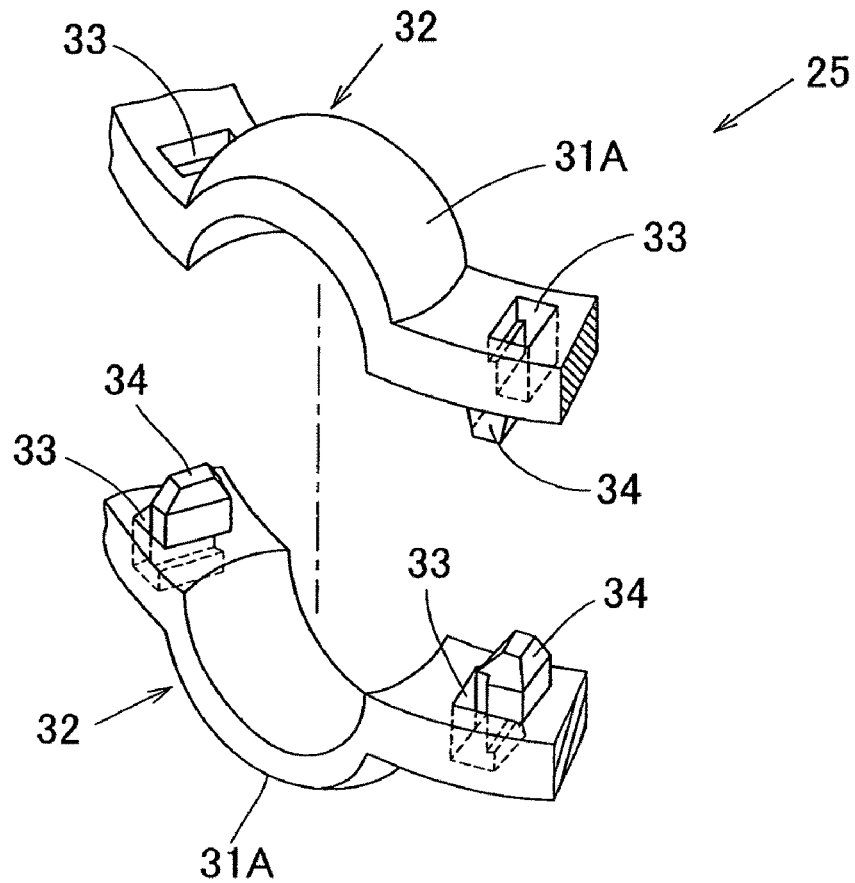
FIG. 16 is an exploded perspective view showing a resin made cage to which the bearing ball cage according to this embodiment can be applied.
Figure 17:
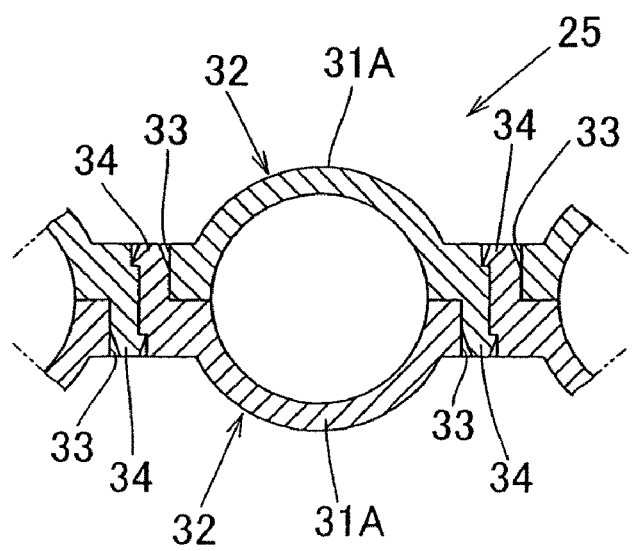
FIG. 17 is a sectional view of the resin made cage.

It is to be noted that although in describing any one of the foregoing embodiments of the present invention, reference has been made to an iron plate blanked cage, the present invention can be equally applied to such a cage 25 made of a resinous material as shown in FIGS. 16 and 17. This resinous cage 25 includes two ring shaped bodies 32 and 32 each in the form of a resin molded product. Each of the ring shaped bodies 32 has one side surface, which is held in abutment with the side surface of the other ring shaped body 32, formed with a plurality of circumferentially equally spaced semispherical pockets 31A each corresponding to the outer periphery of each of the balls. Engagement holes 33 and engagement pawls 34, which cooperate with each other to form respective joints, are provided between the neighboring pockets 31A and 31A and, accordingly, when the engagement pawls 34 in one of the ring shaped bodies 32 are engaged in the corresponding engagement holes 33 in the other ring shaped body 32, the ring shaped bodies 32 can be integrally joined together to complete the cage 25.

Hereinafter, results of tests conducted to ascertain effects brought about by the use of a resin film 39 as is the case with the example shown in and described with particular reference to FIG. 22 will be described. A bearing assembly incorporating therein an iron plate blanked cage 5 and a bearing assembly incorporating therein such a cage 5 of a type, in which the inner surface of each of the pockets 11 is formed with a film 39 (15 μm in average film thickness) made of an polyimide resin, were tested under such conditions as shown in Table 3. Results of those tests are shown in Table 4. As can readily be understood from Table 4, the lifetime of the bearing assembly having the polyimide resin film 39 formed on the pocket inner surface is 3.1 times that of the bearing assembly utilizing the cage having no resin film formed thereon.

While the foregoing is directed to the case in which the film formed on the pocket surface is of the resin system, an effect similar to that exhibited by the film of the resin system can be obtained as long as generation of the iron-to-iron friction induced swarf of metal can be avoided and, therefore, similar effects can also be achieved in the case that the film is of a kind containing as a principal component a solid lubricant such as, for example, molybdenum disulfide or graphite or a soft metal such as, for example, copper or silver.

TABLE 3

| Bearing Assembly Tested | 6204ZZC3 |
|---|---|
| Cage | With Film, Without Film |
| Grease | MULTEMP PS No. 2 |
| Amt. Filled % | 15% of Total Space Volume |
| Rotational Speed, min$^{-1}$ | 10,000 |
| Load, N | Fr = Fa = 67 |
| Test Temp., °C. | 120 |

TABLE 4

| | Cage | |
|---|---|---|
| | With Film | Without Film |
| Lifetime, h | 126 | 332 |
| | 157 | 254 |
| | 113 | 649 |
| Average Value, h | 132 | 412 |
| Lifetime Ratio | 1.0 | 3.1 |

In the description that follows, an example of application of the present invention will be discussed. Although this example of application is also intended to provide a bearing ball cage for a ball bearing assembly, in which deposition of the grease in a seal groove in the bearing rotatable ring will hardly occur to thereby prevent the grease leakage, and also to provide a method of manufacturing such bearing ball cage, the use of a concaved portion 13 employed in accordance with the present invention as hereinbefore described is not essential in the example of application. A bearing ball cage 5 according to this example of application is similar to the bearing ball cage 5 shown in and described with particular reference to FIGS. 1 to 6B, except for the features that will be specifically described hereinafter.

A bearing ball cage 5 according to the example of application is a cage used in conjunction with the ball bearing assembly 1 of the structure shown in and described with particular reference to FIGS. 1 and 2 and is of a ring shaped configuration having pockets 11 defined in a plurality of circumferential locations thereof for retaining corresponding balls 4 and is made up of two annular cage halves 12 that are overlapped on each other in an axially opposed fashion. Each of those cage halves 12 is of a configuration having a plurality of spherical shell shaped plate segments 11A, each having an inner surface defining half of the respective pocket, and flat plate segments 12a, each defining an area between the neighboring pockets 11, in which the flat plate segments 12a and the next adjacent spherical shell shaped plate segments 11A alternate one after another in a direction circumferentially thereof. The cage halves 12 referred to above are each in the form of a press molded product prepared from a metal plate (for example, an iron plate blanked product) and are integrally joined together by means of rivets 19 having been passed through respective rivet holes 18 each defined in the respective flat plate segment 12a. The structure described so far above is similar to that shown in and described with reference to FIGS. 1 to 6B.

Figure 18:
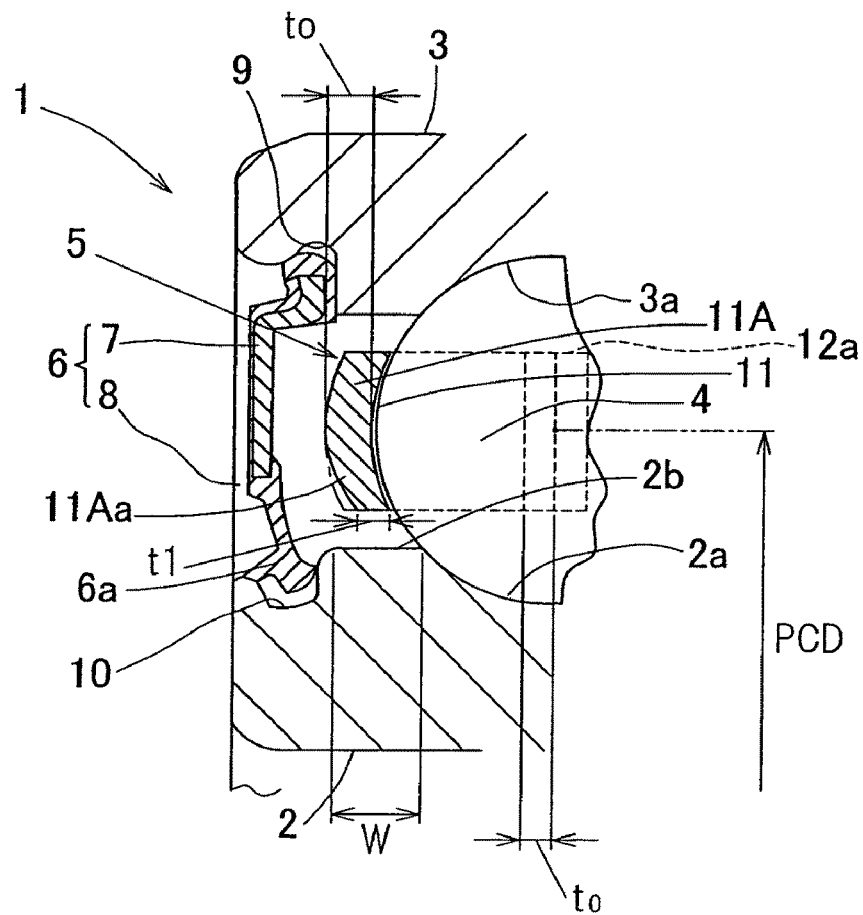
FIG. 18 is a fragmentary perspective view, with a portion cut away, showing the ball bearing assembly having incorporated therein the bearing ball cage according to a mode of application of the present invention.
Figure 20:
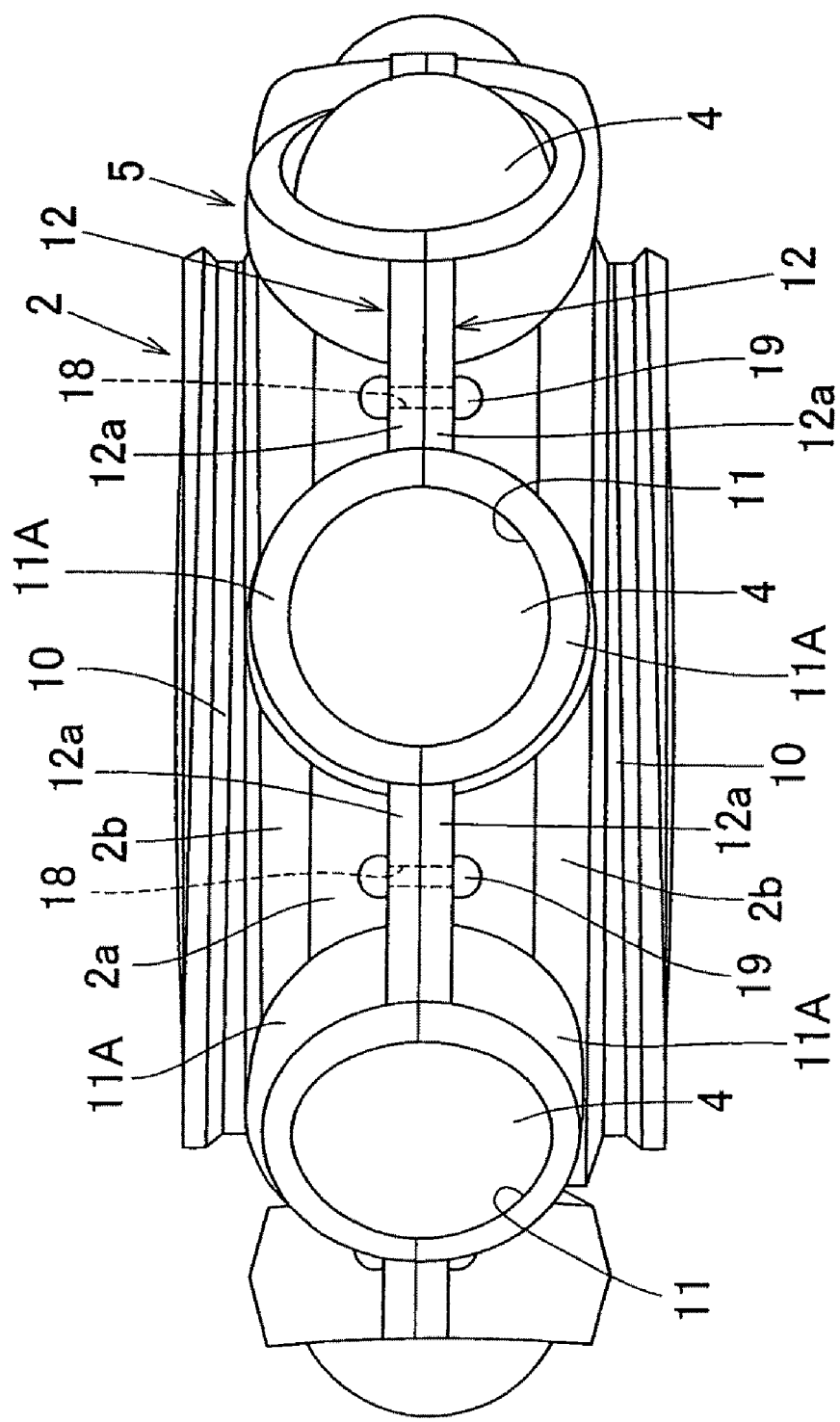
FIG. 20 is a plan view showing an assembly in which the bearing ball cage according to the mode of application is incorporated in the inner ring.

The cage 5 has regions axially overlapping the respective outer diametric surface portions 2b as high as the opposite sides of the raceway surface 2a of the inner ring 2, as shown in FIGS. 18 and 20.

In the construction as hereinabove described, the bearing ball cage 5 according to this example of application has a thin walled portion 11Aa defined in a region radially inwardly of the ball row pitch circle diameter PCD, which is the pitch circle diameter defined by the circular row of the balls in the spherical shell shaped plate segments 11A. This thin walled portion 11Aa is of a structure, in which the plate thickness t1 at the outer diametric surface portion 2b representing a shoulder height on respective sides of the raceway surface 2a of the inner ring 2, is so chosen as to be smaller than the plate thickness t0 of the flat plate segments 12a. The outer diametric surface portion 2b representing the shoulder height is, more specifically, the outer diametric surface portion continuing at a height of a shoulder at the raceway surface 2a of the inner ring 2 and represents, where the seal groove 10 is provided, an outer diametric surface portion delimited between the raceway surface 2a and the seal groove 10. The spherical shell shaped plate segment 11A has a reduced plate thickness t1 that is located within the axial range W of the outer diametric surface portion 2b. It is to be noted that in FIG. 18, the sectional shape of the spherical shell shaped plate segment 11A, which is not reduced in wall thickness, is shown by the imaginary line.

Reduction in plate thickness t1 may be effected over the entire region ranging from a location corresponding to the ball row pitch circle diameter PCD to an inner diametric side in the cage radial direction or, alternatively, within a range from a location intermediate between the ball row pitch circle diameter PCD and the cage inner diametric edge to the inner diametric edge. In those cases, the plate thickness t1 may be gradually reduced towards the inner diametric side in the cage radial direction so that the inner diametric edge can have a minimum plate thickness, or may be substantially uniformly reduced over the entirety of the range where the reduction is to be effected. Also, the plate thickness may be reduced to change the shape on the pocket outer surface side while the pocket inner surface shape of the spherical shell shaped plate segment 11A remains unchanged, or the plate thickness may be reduced to change the shape on the pocket inner surface side while the outer surface shape of the spherical shell shaped plate segment 11A remains unchanged.

Figure 21:
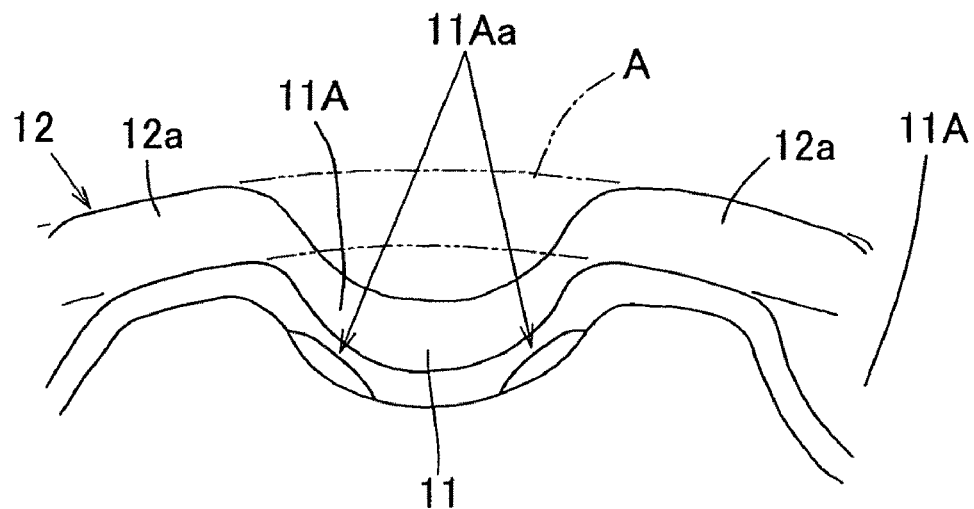
FIG. 21 is a fragmentary enlarged perspective view showing a modified form of the spherical shell shaped plate segment employed in one of the cage halves.

In addition, although in this example of application, a substantially entire range of the arcuate shape along the inner diametric edge of the spherical shell shaped plate segment 11A is thinned except for its opposite ends, depending on the relationship between the outer diametric surface portion 2b representing the shoulder height of the inner ring 2 and the width of the cage 5, the thin walled portion 11Aa, which has been reduced in wall thickness, may be separated into two locations on respective sides of the arcuate shape of the inner diametric edge in the spherical shell shaped plate segment 11A, except for an intermediate portion of such arcuate shape, as shown in FIG. 21.

This cage 5 is of the type, in which the thin walled portion 11Aa is formed in the inner diametric portion of the spherical shell shaped plate segment 11A forming each of the pockets 11 as hereinabove described and this thin walled portion 11Aa represents a portion, where it axially overlaps the outer diametric surface portion 2b at the shoulder height of the inner ring and where the grease sticking to the surface of the respective ball 4 can be scraped off by the cage 5 or the grease scraped off may be shifted into. Since if the plate thickness t1 of this portion 11Aa is small, the amount of grease which may be accumulated there can be reduced, the frequency, with which the grease reaches the outer diametric surface portion 2b of the inner ring 2, and the amount of the grease reaching the outer diametric surface portion 2b of the inner ring 2 can be reduced and, consequently, the leakage of the grease to the outside of the bearing assembly can be prevented. In other words, shift of the grease towards the outer diametric side of the cage 5 can be facilitated and the amount of grease accumulated on the inner diametric side can be reduced accordingly.

However, reduction in plate thickness of the cage 5 in its entirety tends to be accompanied by reduction in strength of the cage 5 itself and, accordingly, it is difficult to achieve it because the cage 5 is susceptible to damage particularly where repeated stresses act on the cage 5 due to misalignment or external vibration.

In view of the above, the plate thickness of the inner diametric portion of the cage 5 is reduced only within the range W where it overlaps the outer diametric surface portion 2b representing the shoulder of the inner ring 2, and therefore a bearing ball cage 5 can be produced, which is substantially free from reduction in strength and in which the grease leakage can be avoided.

Figure 19:
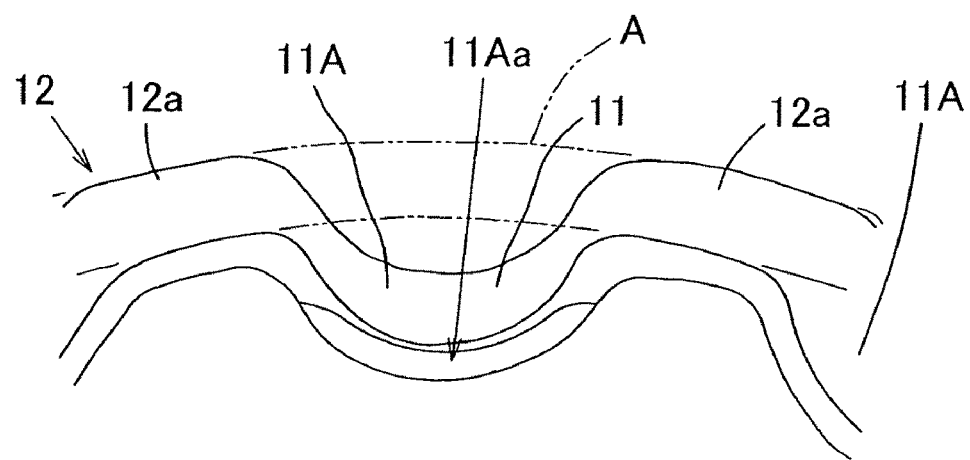
FIG. 19 is a fragmentary enlarged perspective view showing the spherical shell shaped plate segment employed in one of the cage halves.

It is to be noted that for the reduction in plate thickness t1 referred to above, the press molding may be effected while only the inner diametric side of a flat plate blanked in a shape of a circular ring is reduced in thickness prior to the press molding. Also, a gap distribution between a pair of dies may be altered so that in a press mold that may be used for making the cage from a circular ring shaped flat plate of a uniform thickness by the use of a press, the plate thickness of only a region shown in FIG. 19 or 21 can be reduced.

Yet, although in the foregoing example of application reference has been made to the iron plate blanked cage for a deep groove ball bearing assembly, this example of application can be equally applied to the resinous cage of the two component type hereinbefore described with particular reference to FIGS. 16 and 17.

The example of application hereinabove fully described includes the following modes of application.

[Mode of Application 1]

The bearing ball cage encompassed within this Mode of Application 1 is a cage for a ball bearing assembly, which is ring-shaped and has a pocket for accommodating one of balls of the ball bearing assembly defined at a plurality of locations in a direction circumferentially thereof, and in which two annular cage halves are overlapped one above the other in a fashion axially opposed relative to each other, in which each of those cage halves is of a configuration having a plurality of spherical shell shaped plate segments, each having an inner surface defining half of the respective pocket, and flat plate segments, each defining an area between the neighboring pockets, the flat plate segments and the next adjacent spherical shell shaped plate segments alternating one after another in a direction circumferentially thereof, and in which at least the plate thickness at portion radially inwardly of a ball row pitch circle in the spherical shaped plate segment, located at an outer diametrical surface portion at a shoulder height on respective sides of the raceway surface of the inner ring, is made smaller than the plate thickness of each of the flat plate segment.

It is to be noted that the axial range of that portion where the plate thickness is reduced may be the entirety of the spherical shell shaped plate segment or a part thereof and at least that portion located at the outer diametric surface portion on respective sides of the raceway surface of the inner ring is reduced in thickness.

According to the above described Mode of Application 1, since the plate thickness of at least that portion located at the outer diametric surface portion on respective sides of the raceway surface of the bearing inner ring at the shoulder height, is reduced to a value smaller than the plate thickness of each of the flat plate segments, no grease will be deposited in the inner ring shoulder. Because of this, the grease will hardly deposit in the inner ring seal groove and even if the seal either the contact type or the non-contact type is employed, the leakage of the grease can be prevented. This can be characteristically observed particularly during the rotation of the outer ring. In addition, since there is no need to provide the seal with any additional feature to prevent the grease leakage, the seal can be designed, which is customized to achieve the resistance to muddy water, resistance to dust and low torque. When such a low torque seal is used in combination with a cage of the present invention, the bearing assembly free from the grease leakage and of the low torque can be obtained.

Also, when the standard plate thickness, which represents the plate thickness of the flat plate segments of each of the cage halves and of the outer diametric side portion of the ball row pitch circle of each of the spherical shell shaped plate segments, is made equal to that employed in the conventional art, only the grease leakage can be avoided without accompanying any reduction in strength of the cage. Moreover, in view of the fact that the shape of each of the pockets in which the respective balls contact, is similar to that employed in the conventional art, no increase occur in force of interference between the cages which would result from an increase of the range of movement of the cage.

[Mode of Application 2]

The Mode of Application 2 is such that in the Mode of Application 1 hereinabove described, where the cage is constructed with the two cage halves, each of those two cage halves may be prepared from a press molded article of a metallic plate. In other words, it may be in the form of a so-called iron plate blanked cage.

The above described pocket shape in the cage according to this Mode of Application 2 can be molded by means of a press work applied to the metallic plate and, where the press work is employed, the cost can be reduced and a high strength can be obtained and, also, the distance to the seal does not make any difference from that in the standard iron plate blanked cage.

It is to be noted that the bearing ball cage according to this Mode of Application 2 can be applied not only to the iron plate blanked cage, but also to the resinous cage of the two component type.

[Mode of Application 3]

The press die set encompassed within this Mode of Application 3 is the press die set used to manufacture the bearing ball cage according to the Mode of Application 1 described hereinbefore and includes a convex press die for defining the inner surface of each of the spherical shell shaped plate segments of the cage halves and a concave press die for defining an outer surface of each of the respective spherical shell shaped plate segments. A molding surface of the convex press die referred to above represents a convexed spherical surface following the concaved portion forming the inner surface of each of the pockets and represents such a shape, a portion of which shape has a concaved portion forming die portion following the concaved portion.

According to the foregoing, the cage can be efficiently manufactured with no need to increase the number of process steps required to manufacture the cage.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A cage for a ball bearing assembly, comprising:
a plurality of pockets, each of the pockets accommodating a ball of the ball bearing assembly, each of the plurality of pockets being defined at a plurality of locations in a circumferential direction of the ball bearing assembly,
wherein each of the plurality of pockets has an inner surface so shaped as to represent a concaved surface in which a portion on an inner diametric side of a ball row pitch circle described by a circular row of the balls has its diameter reduced towards a cage inner diametric side open edge, and
wherein the inner surface of each of the pockets further includes a concaved portion extending concavely from the open edge on the cage inner diametric side towards a cage outer diametric side, the concaved portion having a radius of curvature smaller than that of the concaved spherical surface forming the inner surface of each of the plurality of pockets, taken along a cage circumferential direction.

2. The cage for the ball bearing assembly as claimed in claim 1, wherein the concaved portion is provided at one location extending on both sides of the open edge of each of the plurality of pockets with respect to a center thereof in the cage circumferential direction and has a width greater than half the width of each of the pockets in the cage circumferential direction,
the concaved portion has an inner surface shape representing a shape of a cylindrical surface occupying a portion of a contour of a virtual cylinder extending about a straight line in a radial direction of the cage, and
the concaved portion extends from the open edge on the cage inner diametric side towards a position near the ball row pitch circle, becoming shallower and narrower as it approaches from the cage inner diametric edge towards the ball row pitch circle.

3. The cage for the ball bearing assembly as claimed in claim 1, wherein the concaved portion is provided at a plurality of locations on respective sides of the open edge of each of the plurality of pockets with respect to a center thereof in the cage circumferential direction and has an inner surface shape representing a shape of a cylindrical surface occupying a portion of a contour of a virtual cylinder extending about a straight line in a radial direction of the cage, and
the concaved portion extends from the open edge on the cage inner diametric side towards a position near the ball row pitch circle, becoming shallower and narrower as it approaches from the cage inner diametric edge towards the ball row pitch circle.

4. The cage for the ball bearing assembly as claimed in claim 1, wherein the concaved portion is provided at two locations on respective sides of the open edge of each of the plurality of pockets with respect to a center thereof in the cage circumferential direction and extends to a position near a cage outer diametric edge,
each of the concaved portions at the two locations is of a shape occupying a portion of a contour of one virtual ring, the virtual ring having a circular sectional shape at any arbitrary circumferential position and having a ring outer diameter sufficient to be accommodated within the corresponding pocket with a ring center inclined relative to a cage center axis.

5. The cage for the ball bearing assembly as claimed in claim 1, wherein the inner surface of each of the plurality of pockets represents a concaved spherical shape and the concaved portion has a depth so chosen that the distance from a center of the concaved spherical surface defining the inner surface of each pocket to a deepest position of the concaved portion is equal to or greater than 1.05 times a radius of each of the balls.

6. The cage for the ball bearing assembly as claimed in claim 1, wherein the cage is made of a metallic material and the inner surface of each of the pockets in this cage is coated with a film.

7. The cage for the ball bearing assembly as claimed in claim 6, wherein the film on the inner surface of each of the pockets contains as a principal component, a resin, a soft metal, a solid lubricant or a combination thereof.

8. The cage for the ball bearing assembly as claimed in claim 1, wherein the cage comprises two annular cage halves, which are overlapped one above the other in a fashion axially opposed relative to each other, in which each of those cage halves is of a configuration having a plurality of spherical shell shaped plate segments, each having an inner surface defining half of the respective pocket, and flat plate segments, each defining an area between the neighboring pockets, the spherical shell shaped plate segments and the flat plate segments alternating one after another in a direction circumferentially thereof.

9. The cage for the ball bearing assembly as claimed in claim 8, wherein each of the two cage halves is a press molded product of a metal plate.

10. A method of making a bearing ball cage of the structure described in claim 9, comprising:

preparing a convex press die for defining an inner surface of each of the spherical shell shaped plate segments of the cage halves and a concave press die for defining an outer surface of each of the spherical shell shaped plate segments, in which the convex press die has a molding surface representing a convexed spherical surface shape following the concaved spherical surface defining the inner surface of each of the pockets and also representing a shape following the concaved portion;

pressing a ring shaped metal band, while the latter is sandwiched between the convex press die and the concave press die, to thereby form each of the cage halves; and joining the resultant cage halves together to complete the bearing ball cage.

11. The method of making the bearing ball cage as claimed in claim 10, wherein the convex press die is surface treated by means of shot blasting, grinding with use of electron beams or lapping by spraying of an abrasive material.

* * * * *